United States Patent
Ichihara

(10) Patent No.: US 9,168,788 B2
(45) Date of Patent: Oct. 27, 2015

(54) PNEUMATIC TIRE

(75) Inventor: Eiji Ichihara, Sayamai (JP)

(73) Assignee: BRIDGESTONE CORPORATION, Tokyo (JP)

( * ) Notice: Subject to any disclaimer, the term of this patent is extended or adjusted under 35 U.S.C. 154(b) by 169 days.

(21) Appl. No.: 13/388,868

(22) PCT Filed: Jul. 30, 2010

(86) PCT No.: PCT/JP2010/004854
§ 371 (c)(1),
(2), (4) Date: Feb. 3, 2012

(87) PCT Pub. No.: WO2011/016215
PCT Pub. Date: Feb. 10, 2011

(65) Prior Publication Data
US 2012/0125508 A1    May 24, 2012

(30) Foreign Application Priority Data

Aug. 5, 2009  (JP) ................................ 2009-182506
Jul. 13, 2010  (JP) ................................ 2010-158532
Jul. 13, 2010  (JP) ................................ 2010-158553
Jul. 15, 2010  (JP) ................................ 2010-160526

(51) Int. Cl.
B60C 9/18    (2006.01)
B60C 9/22    (2006.01)
B60C 9/26    (2006.01)
(Continued)

(52) U.S. Cl.
CPC ................. *B60C 9/26* (2013.01); *B60C 9/2009* (2013.04); *B60C 11/0083* (2013.04); *B60C 2009/209* (2013.04); *B60C 2009/2058* (2013.04);
(Continued)

(58) Field of Classification Search
CPC .......... B60C 9/18; B60C 9/20; B60C 9/2003; B60C 9/2009; B60C 9/22
See application file for complete search history.

(56) References Cited

U.S. PATENT DOCUMENTS 4,235,274 A * 11/1980 Suzuki et al. .................. 152/527
4,688,615 A *  8/1987 Lee ................................ 152/531
(Continued)

FOREIGN PATENT DOCUMENTS

CN   1575237 A   2/2005
CN   1984785 A   6/2007
(Continued)

OTHER PUBLICATIONS

Machine translation of JP 2002-19414, 2002.*
(Continued)

*Primary Examiner* — Justin Fischer
(74) *Attorney, Agent, or Firm* — Sughrue Mion, PLLC

(57) ABSTRACT

Proposed is a pneumatic tire having excellent durability, handling stability and uneven wear resistance even if weight reduction is achieved by improving a belt.
The pneumatic tire according to the present invention having a carcass layer 5 toroidally extending from a tread portion 3 through a side wall portion 2 to a bead portion 1, and a belt layer 6 disposed at the outer side of the carcass layer 5 in the tire radial direction, in which the carcass layer 5 includes one or more carcass plies 5a, the belt layer 6 includes a first belt 7 having a first cord 7a inclined with respect to a tire equator S at an angle in the range of 15° to 75° and a second belt 8 having a second cord 8a extending in parallel to the tire equator S, said first belt 7 having a tensile strength smaller than that of the second belt 8.

5 Claims, 11 Drawing Sheets

(51) Int. Cl.
*B60C 11/00* (2006.01)
*B60C 9/20* (2006.01)

(52) U.S. Cl.
CPC .... *B60C2009/2295* (2013.04); *Y10T 152/1081* (2015.01); *Y10T 152/10801* (2015.01)

(56) References Cited

U.S. PATENT DOCUMENTS

| | | | | |
|---|---|---|---|---|
| 4,702,293 | A | * 10/1987 | Iwata et al. | 152/531 |
| 4,947,914 | A | * 8/1990 | Noma et al. | 152/531 |
| 5,221,385 | A | * 6/1993 | Hanada et al. | 152/543 |
| 5,339,878 | A | * 8/1994 | Takase | 152/527 |
| 7,870,682 | B2 | * 1/2011 | Meschter et al. | 36/45 |
| 2003/0201046 | A1 | 10/2003 | Rayman et al. | |

FOREIGN PATENT DOCUMENTS

| | | | |
|---|---|---|---|
| EP | 738618 | * | 10/1996 |
| FR | 2566335 | * | 12/1985 |
| JP | 04-78602 | A | 3/1992 |
| JP | 04-163212 | A | 6/1992 |
| JP | 061109 | A | 1/1994 |
| JP | 09-020106 | A | 1/1997 |
| JP | 2002-19414 | * | 1/2002 |
| JP | 2008-049923 | A | 3/2008 |
| JP | 2008-155857 | A | 7/2008 |
| JP | 2008-201336 | A | 9/2008 |
| JP | 2009-001080 | A | 1/2009 |
| JP | 2009-255619 | A | 11/2009 |
| JP | 2010006125 | A | 1/2010 |
| WO | WO 2008/035646 | A1 | 3/2008 |

OTHER PUBLICATIONS

Machine translation of FR 2566335, 1985.*
Chinese Office Action, dated Sep. 29, 2013, issued in corresponding Chinese Patent Application No. 201080043036.8.
International Search Report of PCT/JP2010/004854 dated Aug. 31, 2010.
Japanese Office Action, dated Jun. 4, 2013, issued in corresponding Japanese Patent Application No. 2009-182506.
Japanese Decision of Refusal, dated Nov. 12, 2013, issued in corresponding Japanese Patent Application No. 2009-182506.
Chinese Office Action issued in Chinese Application No. 201080043036.8 dated Feb. 18, 2014.
Chinese Office Action issued in Chinese Application No. 201080043036.8 dated Sep. 2, 2014.
Japanese Office Action, dated Jun. 3, 2014, issued in corresponding Japanese Patent Application No. 2010-160526.
Communication dated Dec. 9, 2014, issued by the Japanese Patent Office in counterpart Application No. 2010158532.
Communication dated Dec. 2, 2014, issued by the Japanese Patent Office in counterpart Application No. 2010160526.
Communication dated Dec. 2, 2014, issued by the Japanese Patent Office in counterpart Application No. 2010158553.
Communication dated Jan. 15, 2015 from the State Intellectual Property Office of People's Republic of China in counterpart Application No. 201080043036.8.
Communication dated Mar. 6, 2015 from the European Patent Office in counterpart Application No. 10806215.9.
Communication dated Jun. 12, 2015 from the State Intellectual Property Office of the P.R.C. in counterpart application No. 201080043036.8.

* cited by examiner

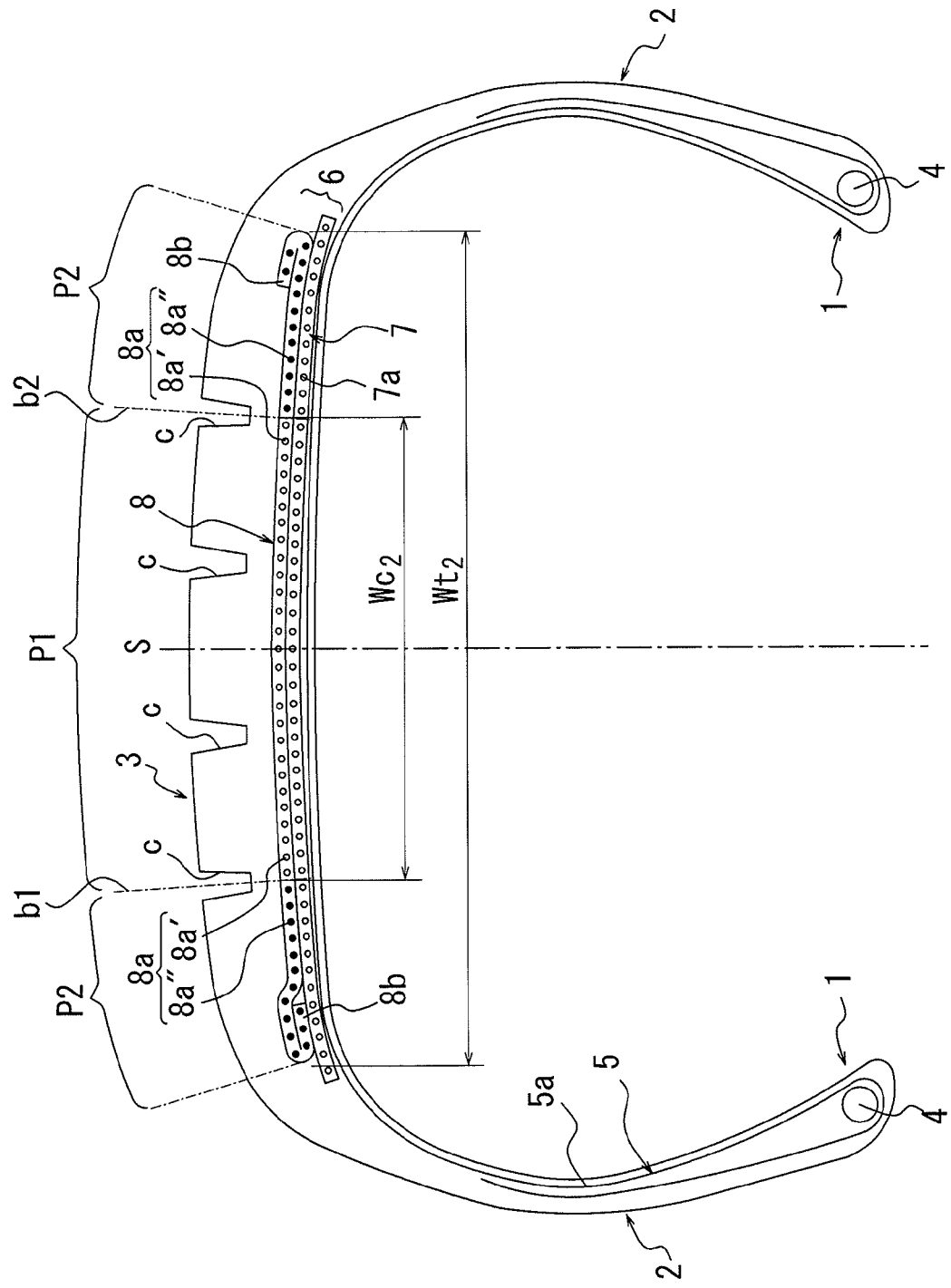

PNEUMATIC TIRE

CROSS REFERENCE TO RELATED APPLICATIONS

This application is a National Stage of International Application No. PCT/JP2010/004854 filed Jul. 30, 2010, claiming priority based on Japanese Patent Application Nos. 2009-182506 filed Aug. 5, 2009, 2010-158532 filed Jul. 13, 2010, 2010-158553 filed Jul. 13, 2010 and 2010-160526 filed Jul. 15, 2010, the contents of all of which are incorporated herein by reference in their entirety.

TECHNICAL FIELD

The present invention relates to a pneumatic tire suitable to be mounted to a passenger vehicle or other general-type vehicles, and in particular, to a pneumatic tire exhibiting excellent durability, uneven wear resistance and handling stability while achieving the reduction in weight thereof.

RELATED ART

In recent years, more attentions have been drawn to the global warming or other environment problems. In such a movement, tires having less impact on the environment have been actively developed. As a means for addressing the above-described environmental problems, the amount of materials used in the tire is minimized to reduce the weight of the tire, and by mounting such a tire, the energy consumption of the passenger vehicle and the like is decreased. Further, as the above-described means, simplification has been made to belts employing a high-density material such as a steel cord. For example, Patent Documents 1 and 2 propose a belt structure having an inclined belt layer containing cords extending obliquely at a predetermined angle with respect to a tire equator, and a circumferential belt layer containing cords extending substantially in parallel to the tire equator, the inclined belt layer and the circumferential belt layer being layered to each other.

RELATED ART DOCUMENTS

Patent Documents

Patent Document 1: Japanese Patent Application Laid-open No. 4-78602
Patent Document 2: Japanese Patent Application Laid-open No. 4-163212

DISCLOSURE OF THE INVENTION

Problems to be Solved by the Invention

With the tire having the above-described configuration, in order to further reduce the weight, it is necessary, for example, to change the cords of the belt into those having reduced weight, or reduce the number of cords embedded therein. However, in general, this leads to a reduction in the tensile strength of the belt, which makes it difficult to secure the breaking strength (durability) of the tire. In particular, in the tire having a circumferential belt layer consisting of steel cords as described in Patent Document 1, the steel cords are weak against the fatigue resulting from cyclic compression and tension. In particular, the circumferential belt layer is subjected to large compression and tension inputs during travel, and hence, the durability needs to be improved. Further, although the problem of durability can be solved by employing organic fibers for the cords constituting the circumferential belt layer as described in Patent Document 2, the organic fibers has a lower rigidity as compared with the steel cords. This leads to another problem that sufficient cornering force cannot be obtained during the cornering, and hence, the handling stability deteriorates. Yet further, general tires have a crown in the tread portion. This causes a difference in the length in the tire circumferential direction between a central portion located at the center of the tread portion in the width direction, and shoulder portions located on the outer side in the width direction. Therefore, when the tire rotates on a flat road surface, the central portion is subjected to a compression while the shoulder portions are subjected to a tension. In the case of employing cord having high strength and high rigidity such as the steel cord, the belt containing the cords hardly compresses, and hence, the large shear deformation occurs in the tread rubber located between the belt and the road surface. Therefore, there is a concern that the energy loss becomes larger, and, the rolling resistance increases, whereby the shearing force increases, deteriorating the uneven wear resistance.

A problem of the present invention is to provide a pneumatic tire exhibiting excellent durability, handling stability and uneven wear resistance even if weight of the pneumatic tire is reduced by an improved belt thereof.

Means for Solving the Problem

The present invention provides a pneumatic tire having a carcass layer toroidally extending from a tread portion through a side wall portion to a bead portion, and a belt layer disposed at the outer side of the carcass layer in the tire radial direction, in which
the carcass layer includes one or more carcass plies, and
the belt layer includes a first belt having a first cord inclined with respect to a tire equator at an angle in the range of 15° to 75° and a second cord having a second cord extending in parallel to the tire equator,
the first belt having a tensile strength smaller than that of the second belt.
In this case, the tensile strength of the second belt is preferably 1.5 to 4 times the tensile strength of the first belt.

The present invention provides a pneumatic tire having a carcass layer toroidally extending from a tread portion through a side wall portion to a bead portion, and a belt layer disposed at the outer side of the carcass layer, in which
the carcass layer includes one or more carcass plies,
the belt layer includes a first belt having a first cord inclined with respect to a tire equator at an angle in the range of 15° to 75°, and a second belt having a second cord extending in parallel to the tire equator, and
the second belt satisfies a relationship $0.003 < \delta/Rs < 0.02$, where Rs is a length in the radial direction from an axis of the tire to a center of the second belt in the width direction in a cross section including the axis of the tire in a state where the tire is assembled with an applicable rim and inflated to an inner pressure, Re is a length in the radial direction from the axis of the tire to the outer most end of the second belt in the width direction, and $\delta$ is a difference between the length Rs in the radial direction and the length Re in the radial direction.

In this case, the tread portion preferably has a curvature radius Rt of more than or equal to 700 mm at a center area of the tread portion, Rt being a curvature radius of an outer surface of the tread portion in a cross section including the axis of the tire.

Further, the present invention provides a pneumatic tire having a carcass layer toroidally extending from a tread portion through a side wall portion to a bead portion, and a belt layer disposed at the outer side of the carcass layer in the tire radial direction, in which the carcass layer includes one or more carcass plies, the belt layer includes a first belt having a first cord inclined with respect to a tire equator at an angle in the range of 15° to 75°, and a second belt having a second cord extending in parallel to the tire equator, and in the case where the second cord is divided into a center area located at the center of the tread portion in the width direction and a shoulder area located at both ends of the center area, the cord located in the shoulder area has a cord interval wider than that of the cord located in the center area.

In this case, the second cord preferably satisfies a relationship $1.2<Ds/Dc<3.0$, where Dc is an interval of cords located in the center area, and Ds is a cord interval located in the shoulder area.

Further, in this case, the second cord preferably has a cord arrangement in which a cord interval gradually increases from the tire equator toward the outer side in the width direction of the tire.

Further, the pneumatic tire according to the present invention provides a pneumatic tire having a carcass layer toroidally extending between a pair of bead portions and formed by one or more carcass plies, and a belt layer disposed at the outer side of the carcass layer in the tire radial direction, in which the belt layer includes an inclined belt layer (first belt) formed by rubberizing an inclined cord (first cord) extending obliquely at an angle in the range of 15° to 75° with respect to an equatorial surface of the tire, and a circumferential belt layer (second belt) provided adjacently to the inclined belt layer and formed by rubberizing a circumferential cord (second cord) extending at an angle in the range of 0° to 5° with respect to an equator of the tire, in which the circumferential belt layer includes a central portion (center area) including a position of the equator of the tire when viewed in the tire width direction, and a pair of side portions (shoulder areas) located at both sides of the central portion, a tensile rigidity of said central portion being larger than that of said side portions, in which the circumferential cord constituting the side portions of the circumferential belt layer is formed by an organic fiber cord. The tensile rigidity in the circumferential belt layer may be expressed by multiplying the tensile rigidity per each circumferential cord by the number of the circumferential cords per unit width (10 mm in this pneumatic tire) of the circumferential belt layer, and multiplying the thus obtained value by the size of the central portion or side portion in the tire width direction of the circumferential belt layer. Further, the number of the circumferential cords per unit width is measured in a cut cross section obtained by cutting the pneumatic tire along the tire width direction.

In this case, it is preferable that the circumferential cord constituting the central portion of the circumferential belt layer is made of a steel cord.

In this case, the tire preferably satisfies $0.5 \leq Wc_2/Wt_2 \leq 0.95$, where $Wc_2$ is a size of the central portion in the tire width direction, and $Wt_2$ is a size of the entire circumferential belt layer in the tire width direction. Note that the size of the central portion in the tire width direction and the size of the entire circumferential belt layer in the tire width direction are measured in a cut cross section obtained by cutting the pneumatic tire along the tire width direction.

Further, it is preferable that the organic fiber cord constituting the side portions is made of aramid, polyethylene terephthalate or polyethylene naphthalate.

Further, it is preferable that the inclined belt layer is formed by one layer.

Effect of the Invention

The breaking strength of the tire is largely affected by the tension acting in parallel to the equator of the tire. In the case where the first belt has a smaller tensile strength than the second belt, the second belt having the second cord extending in parallel to the equator of the tire secures the breaking strength of the tire, and it is possible to simplify the first belt that hardly contributes to the breaking strength of the tire (reducing the cord strength of the first belt or reducing the number of cords), whereby it is possible to reduce the weight of the tire without deteriorating the breaking strength of the tire.

In the case where the tensile strength of the second belt is set to 1.5 to 4 times the tensile strength of the first belt, it is possible to satisfy the cornering power and the dry performance of the tire while sufficiently reducing the weight of the tire and securing the breaking strength of the tire.

In the case where the second belt satisfies the relationship of the equation $0.003<\delta/Rs<0.02$, the difference in the peripheral length of the second belt is almost equal throughout the entire area of the tire width direction. This makes it possible to suppress the shearing deformation of the tread portion, whereby the rolling resistance and improve the uneven wear resistance can be reduced.

In the case where the curvature radius Rt in the center area of the tread portion is set to 700 mm or more, it is possible to make almost flat the center area of the tread portion that is less likely to be affected by the force from the side wall portion. Thus, the occurrence of the uneven wear can be suppressed, whereby it is possible to more advantageously reduce the rolling resistance.

In the case where the second cord is configured such that the interval of the cords is narrower in the center area where the tension acting in the circumferential direction of the tire is high, and is wider in the shoulder areas where the tension is weaker than the center area, it is possible to further reduce the weight of the time while securing the breaking strength of the tire.

In the case where the second cord satisfies the relationship $1.2<Ds/Dc<3.0$, it is possible to more advantageously reduce the weight of the tire.

In the case where the second cord has the cord arrangement in which the cord interval gradually increases from the tire equator toward the outer side in the width direction of the tire, it is possible to arrange the cord under an optimal distribution for the circumferential tension of the tire having its highest level at the center of the tire and gradually decreasing toward the outer side in the width direction, and further reduce the weight of the tire.

In the case where the tensile rigidity at the central portion of the circumferential belt layer is larger than that at the side portions, and the circumferential cord constituting the side portions of the circumferential belt layer is formed by the organic fiber cord, it is possible to achieve the reduction in the weight of the tire while improving the handling stability and the durability. More specifically, the end portion of the circumferential belt layer located at the outer side in the turning direction during the cornering is a portion of the circumferential belt layer repeatedly receiving the largest compression force. In particular, the extremely large compression force acts on this end portion of the circumferential belt layer at the time of traveling with lower inner pressure in such a case where the inner pressure of the tire is not appropriately managed. Thus, the end portion of the circumferential belt layer is the portion that is most likely to break in the circumferential belt layer due to fatigue. Further, the side force occurring during the cornering is the largest in the vicinity of the equator of the tire where relatively high tension acts on the belt. In order to generate the larger cornering force, it is effective to increase the belt rigidity in the vicinity of the equator of the tire.

In this respect, the central portion of the circumferential belt layer is configured so as to have higher rigidity than the side portions. This makes it possible to secure the favorable cornering force at the central portion. The circumferential cords at the side portions are formed by the organic fiber cord. This makes it possible to reduce the fatigue at the side portions.

BRIEF DESCRIPTION OF THE DRAWINGS

FIG. 12 is a diagram illustrating another embodiment of the pneumatic tire illustrated in FIG. 10, and is a sectional view illustrating a half of the tire taken along the tire width direction.

BEST MODE FOR CARRYING OUT THE INVENTION

Hereinbelow, an embodiment of the present invention will be described in detail with reference to the drawings.

Figure 1:
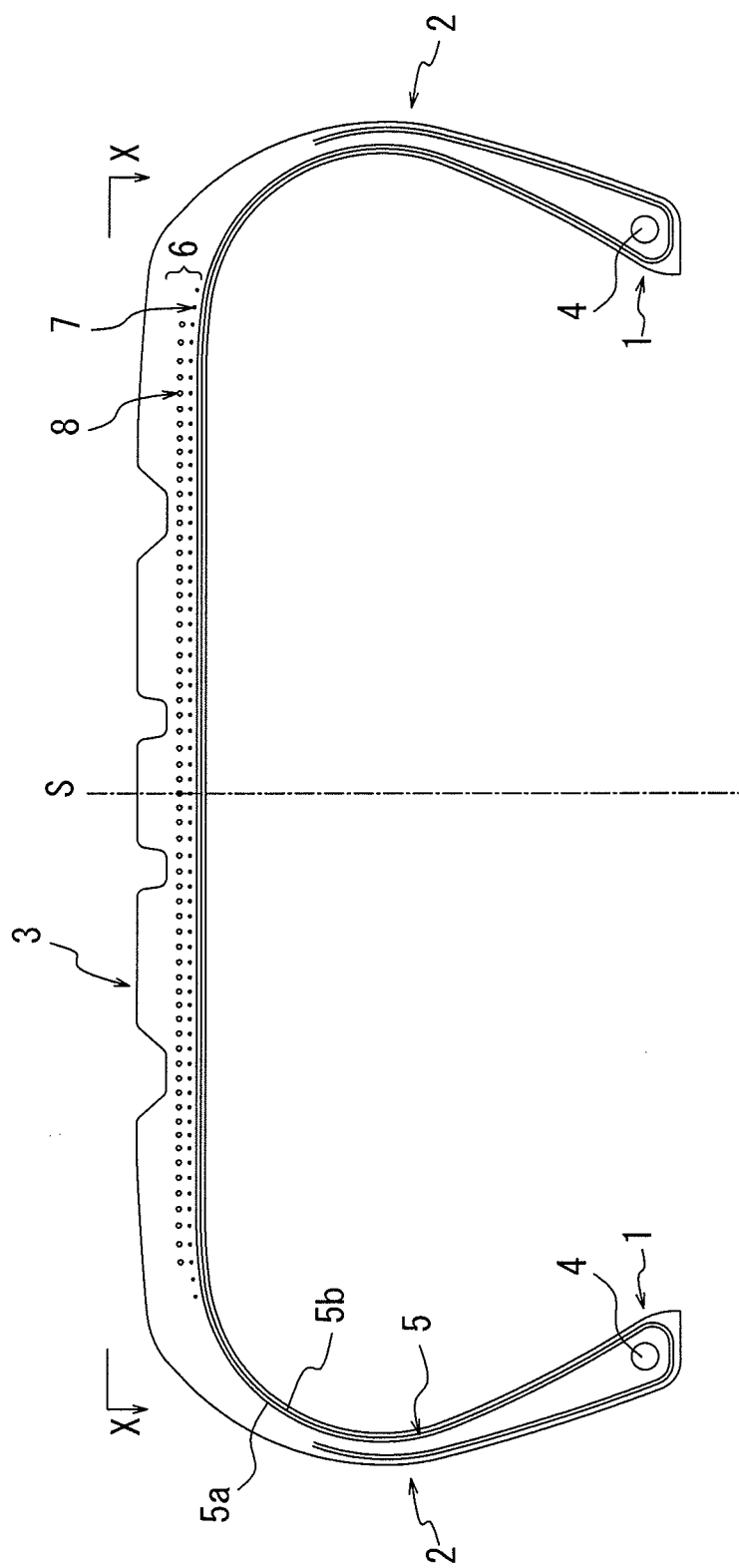
FIG. 1 is a diagram illustrating a pneumatic tire according to a first embodiment of the present invention, and is a diagram illustrating a half part of the tire taken along a meridian section of the tire.
Figure 2:
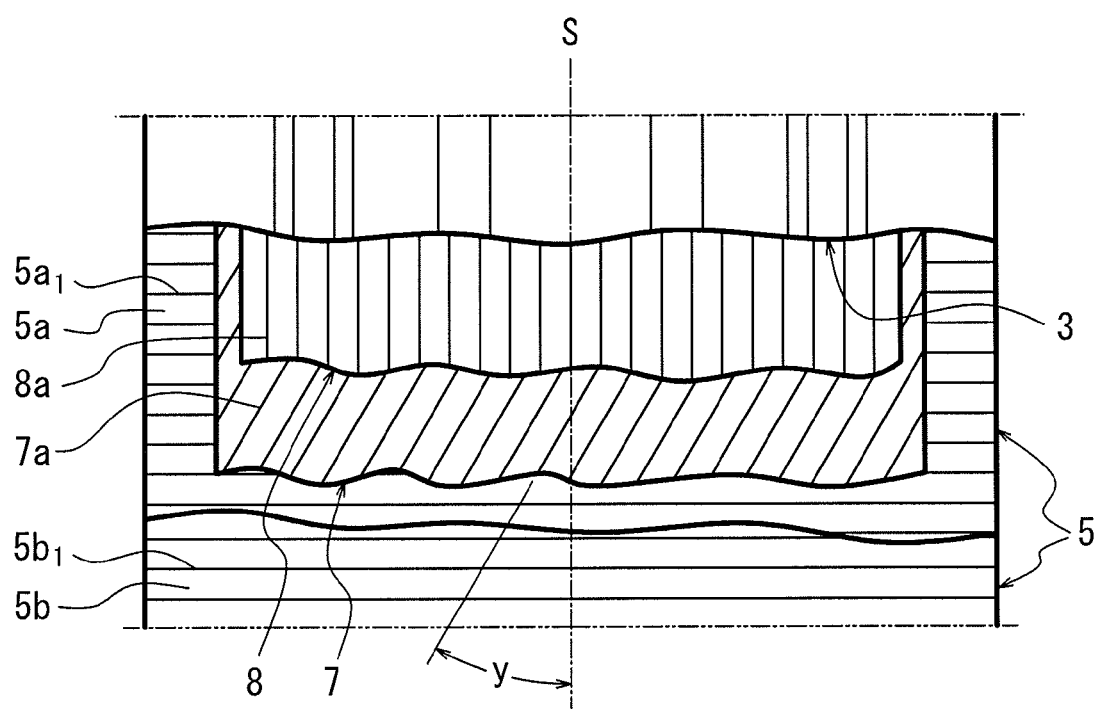
FIG. 2 is a fragmentary view taken in the direction of the arrow X-X in FIG. 1, and a diagram illustrating a structure of the interior of the tire in which a part of the tire is fragmentized.
Figure 3:
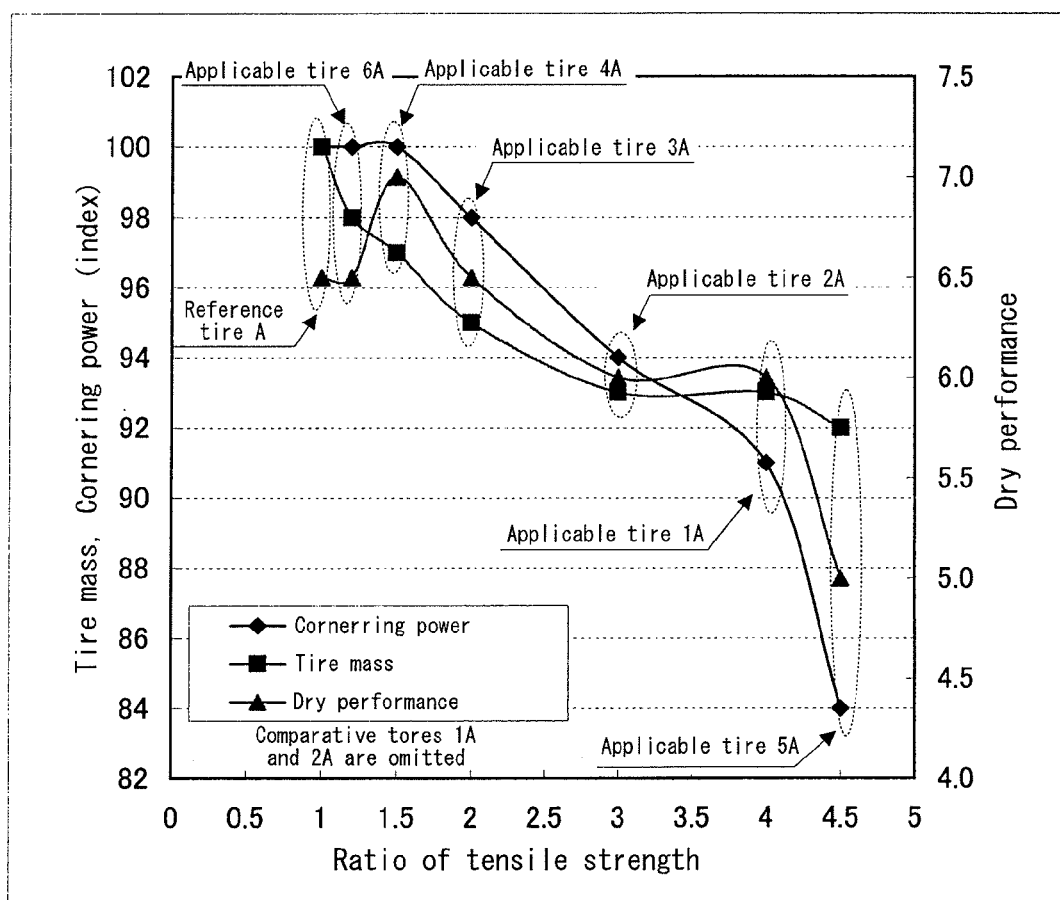
FIG. 3 is a graph concerning a cornering power, a tire mass, and a dry performance in Table 1.

FIG. 1 through FIG. 3 are diagrams illustrating a first embodiment of the pneumatic tire according to the present invention.

In FIG. 1, the reference numeral 1 represents a pair of bead portions continuing in the circumferential direction of the tire, the reference numeral 2 represents a pair of side wall portions each extending outwards from the bead portion 1 toward the substantially radial direction of the tire, and the reference numeral 3 represents a tread portion having a toroidal shape and continuously extending between stretching ends of the side wall portions 2.

The reference numeral 4 represents a pair of bead cores disposed to the bead portions 1, and each of the bead cores 4 has a ring shape and extends in the circumferential direction of the tire.

The reference numeral 5 represents a carcass layer continuously extending between the pair of bead cores 4, and side portions of the carcass layer 5 are turned-up from the inner side to the outer side around the respective bead cores 4. The carcass layer 5 is formed by one or more carcass plies, and FIG. 1 illustrates an example of the carcass layer 5 formed by two carcass plies 5a and 5b. The carcass plies 5a and 5b have cords $5a_1$ and $5b_1$ disposed perpendicularly to an equator S of the tire. The term "perpendicularly" as used in this specification specifically means that an angle with respect to the equator S of the tire falls within the range of 85° to 95°, which takes errors related to manufacturing into consideration. Various selections are possible for the cords $5a_1$ and $5b_1$, and it is possible to employ, for example, organic fibers such as aramid, polyethylene and nylon, a glass fiber, or steel.

The reference numeral 6 represents a belt layer disposed at the outer side of the carcass layer 5 in the tire radial direction. In the drawing, it is illustrated as an example that the belt layer 6 has a first belt 7 and a second belt 8 disposed at the outer side of the first belt 7 in the tire radial direction. However, it may be possible to dispose the first belt 7 on the outer side of the second belt 8 in the tire radial direction.

As illustrated in FIG. 2, the first belt 7 has one or more layers of the first cord 7a (FIG. 2 illustrates a case of one layer) inclined at an angle y with respect to the equator S of the tire. In the present invention, the angle y of the cord 7a is set in the range of 15° to 75°. The reason for this is because, in the case where the angle y is less than 15° with respect to the equator S of the tire, the first cord 7a is almost in parallel to the second cord 8, which will be described later. This makes it difficult to achieve a pantograph effect necessary to secure flexibility in the tire radial direction. Further, with this configuration, there is a possibility that sufficient interlayer shearing rigidity cannot be obtained. On the other hand, in the case where the angle with respect to the equator S of the tire exceeds 75°, the cord 7a is almost in parallel to the cords $5a_1$ and $5b_1$, and hence, there is a possibility that the pantograph effect reduces and the interlayer shearing rigidity becomes insufficient.

A material for the first cord 7a may be selected from various materials, for example, of an organic fiber such as aramid, polyethylene and nylon, a glass fiber, and a steel.

The tensile strength $C_1$ of the first belt 7 is defined by the Equation 1 based on a cord strength $A_1$ (unit: N) of the first cord 7a and a thread count $B_1$ (unit: number of threads per mm) of the first cord 7a in the first belt 7.

$$C_1 = A_1 \times B_1 \quad \text{Equation 1}$$

The second belt 8 has one or more layers (FIG. 2 illustrates a case of one layer) of the second cord 8a extending in parallel to the equator S of the tire. The term "in parallel" as used in this specification specifically means that the angle with respect to the equator S of the tire falls within the range of 0° to 5°. This is because the angle is set to 0° in the case where a cord-rubber covering layer having a wide shape is wrapped one time, and the angle is set to 5° or less by considering the cord angle in the case where the cord-rubber covering layer formed by a narrow ribbon is wrapped in a spiral manner. Further, the error related to the manufacturing is also taken into consideration.

A material for the second cord 8a may be selected from various materials, for example, of an organic fiber such as aramid, polyethylene and nylon, a glass fiber, and a steel. The second belt 8 may have a configuration in which plural second cords 8a are arranged in parallel to the equator S of the tire as described above, or may have a configuration of a spiral cord in which the second cord 8a is wrapped spirally.

The tensile strength $C_2$ of the second belt 8 is defined by the Equation 2 based on a cord strength $A_2$ (unit: N) of the second cord 8a and a thread count $B_2$ (unit: number of threads per mm) of the second cord 8a in the second belt 8.

$$C_2 = A_2 \times B_2 \quad \text{Equation 2}$$

The present invention is an invention for reducing weight while maintaining the breaking strength of the tire. To this end, the second belt 8 secures the strength against the breaking strength of the tire, and the tensile strength $C_1$ of the first belt is set smaller than the tensile strength $C_2$ of the second belt 8 in order to achieve the weight reduction by reducing the cord strength $A_1$ and the thread count $B_1$ of the first belt 7. However, if the weight of the first belt 7 is excessively reduced, the rigidity of the first belt 7 against the bending at the time of cornering also reduces. In order to secure the tire performance without causing the problems during the practical use while maintaining the advantages of the weight reduction, it is preferable to set the tensile strength $C_2$ of the second belt 8 to 1.5 to 4 times the tensile strength $C_1$ of the first belt 7.

From the viewpoint of securing the cornering power, it is desirable to set the belt width of the first belt 7 approximately 5% wider than the belt width of the second belt 8 as illustrated in FIG. 2.

Figure 4:
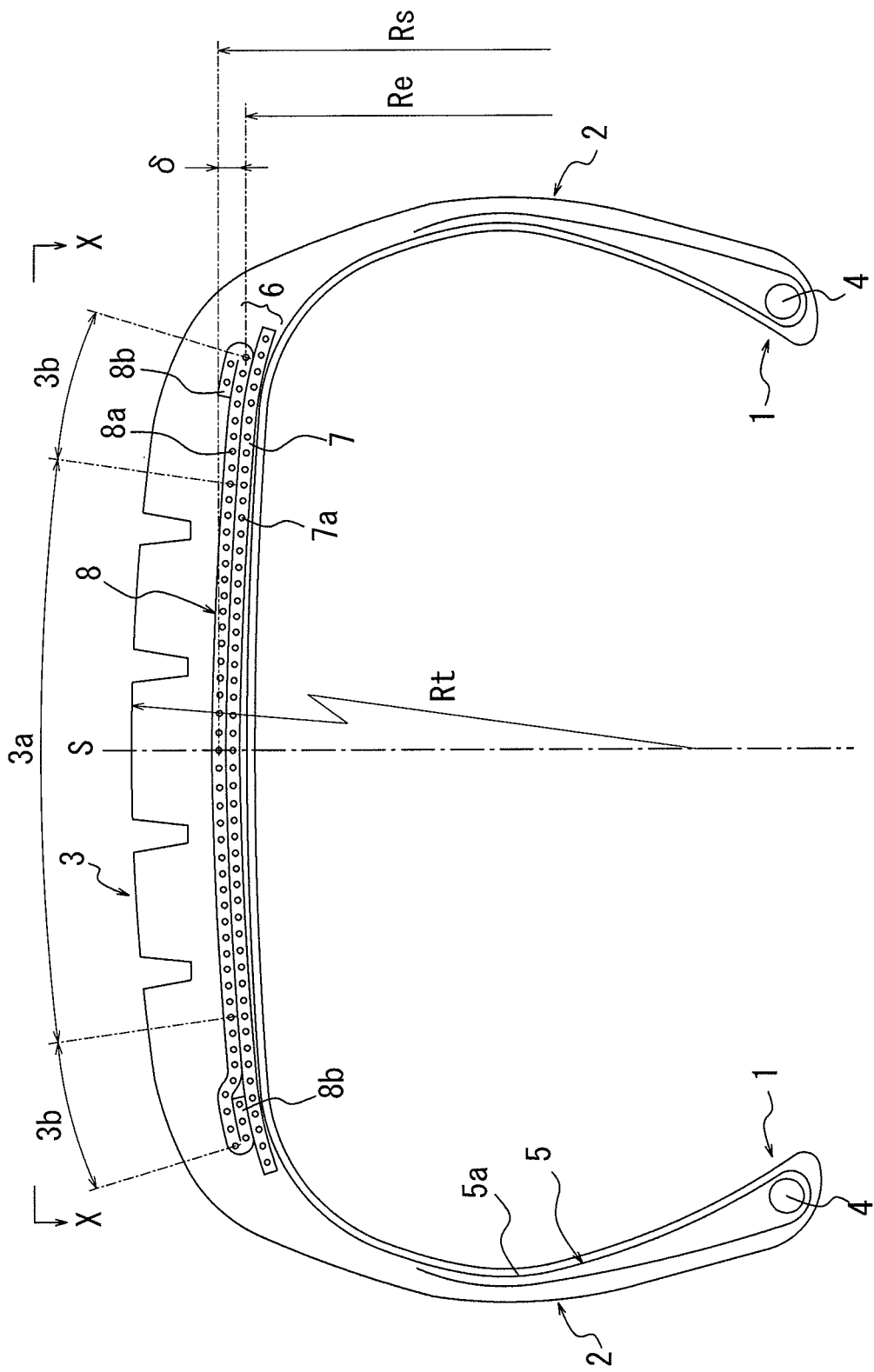
FIG. 4 is a diagram illustrating a pneumatic tire according to a second embodiment of the present invention, and is a sectional view illustrating a half part of the tire taken along the meridian section of the tire including the axis of the tire.
Figure 5:
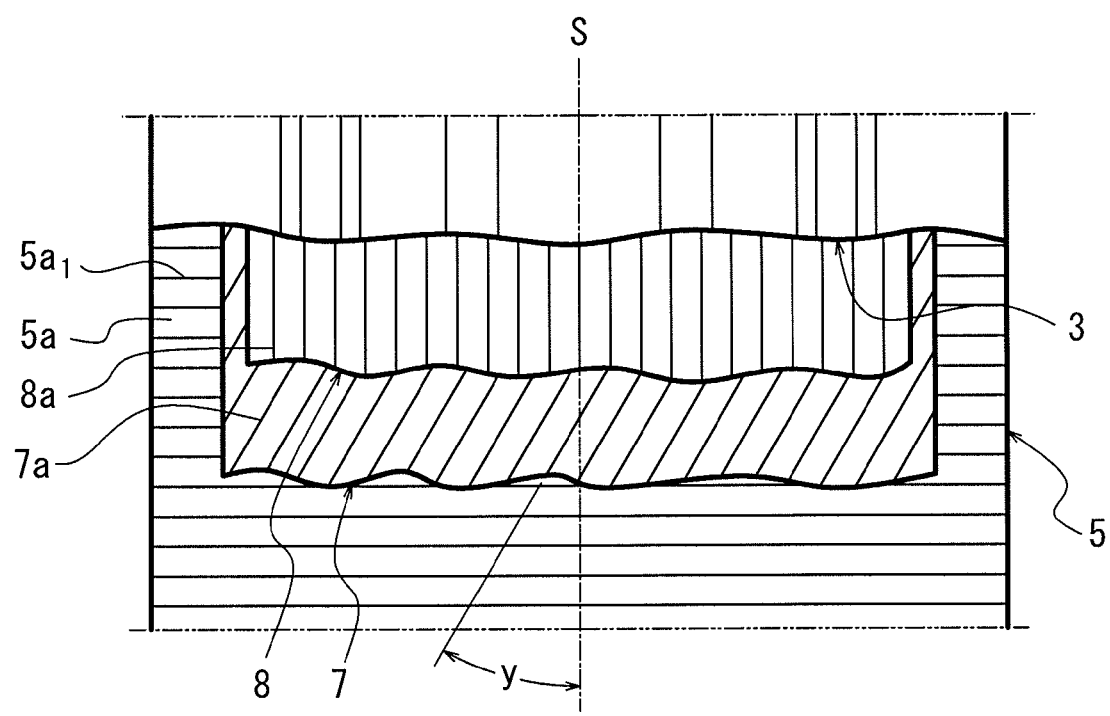
FIG. 5 is a fragmentary view taken in the direction of the arrow X-X in FIG. 4, and a diagram illustrating a structure of the interior of the tire in which a part of the tire is fragmentized (the overlapping portion 8b is not illustrated).

FIG. 4 and FIG. 5 are diagrams illustrating a second embodiment of the pneumatic tire according to the present invention.

In FIG. 4, the reference numeral 1 represents the bead portion, the reference numeral 2 represents the side wall portion, the reference numeral 3 represents the tread portion, the reference numeral 4 represents the bead core, the reference numeral 5 represents the carcass layer, and the reference numeral 6 represents the belt layer. These constituent components are common to those described in the first embodiment, and hence, description thereof will not be repeated. Note that, in the example illustrated in FIG. 4, the carcass layer 5 is illustrated as one carcass ply 5a. However, it may be possible to employ plural carcass plies 5a.

As illustrated in FIG. 5, the first belt 7 has one or more layers (FIG. 5 illustrates a case of one layer) of the first cord 7a inclined at an angle y with respect to the equator S of the tire. The angle y of the first cord 7a is set in the range of 15° to 75°. This is because, in the case where the angle with respect to the equator S of the tire is less than 15°, the first cord 7a is almost in parallel to the second cord 8a, which will be described later. This makes it difficult to achieve a pantograph effect necessary to secure flexibility in the tire radial direction. Further, with this configuration, there is a possibility that sufficient interlayer shearing rigidity cannot be obtained. On the other hand, in the case where the angle with respect to the equator S of the tire exceeds 75°, the cord 7a is almost in parallel to cords of the carcass ply 5a, and hence, there is a possibility that the pantograph effect reduces and the interlayer shearing rigidity becomes insufficient.

A material for the first cord 7a may be selected from various materials, for example, of an organic fiber such as aramid, polyethylene and nylon, a glass fiber, and a steel.

The second belt 8 has one or more layers (FIG. 5 illustrates a case of one layer) of the second cord 8a extending in parallel to the equator S of the tire. The expression "extending in parallel to the equator S of the tire" as used in this specification specifically means extending at an angle range of 0° to 5° with respect to the equator S of the tire. This is because, in the case where a cord-rubber covering layer having a wide shape is wrapped one time, the angle is set to 0°, and in the case where the cord-rubber covering layer formed by a narrow ribbon is wrapped in a spiral manner, the angle is set to 5° or less by considering the cord angle. Further, the error related to the manufacturing is also taken into consideration.

A material for the second cord 8a may be selected from various materials, for example, of an organic fiber such as aramid, polyethylene and nylon, a glass fiber, and a steel. The second belt 8 may have a configuration in which plural second cords 8a are arranged in parallel to the equator S of the tire as described above, or may have a configuration of a spiral cord in which the second cord 8a is wrapped spirally.

It may be possible to provide an overlapping portion 8b at both side ends in the width direction as illustrated in FIG. 4 in the case where the second belt 8 is formed by turning up the narrow width rubber having the second cord 8a spirally in a direction along the circumferential direction of the tire. This prevents occurrence of the separation starting from a wrapping starting end or a wrapping terminating end of the second cord 8a.

The second belt 8 according to the present invention satisfies a relationship $0.003 < \delta/Rs < 0.02$, where Rs is a length in the radial direction from an axis of the tire to a center of the second belt 8 in the width direction, Re is a length in the radial direction from the axis of the tire to the outer most end of the second belt 8 in the width direction in a cross section including the axis of the tire in a state where the tire is assembled with an applicable rim and has an inner pressure inflated, and $\delta$ is a difference between the length Rs in the radial direction and the length Re in the radial direction.

In this specification, the length Rs in the radial direction represents a length from the axis of the tire to the center of the second cord 8a located at the center (equator S of the tire) of the second belt 8 in the width direction, and of a cord closest to the equator S in the case where the second cord 8a is not provided at the equator S of the tire. The length Re of the radial direction represents a length from the axis of the tire to the center of the second cord 8a located at the outermost position of the second belt 8 in the width direction, and of a cord located outermost position other than the overlapping portion 8b in the case where the overlapping portion 8b is provided.

In general, the tire has a crown at the tread portion. Thus, in the second belt 8, the length Rs in the radial direction at the center in the width direction is longer than the length Re in the radial direction at the outermost end in the width direction, causing the difference in the peripheral length of the belt. The second cord 8a extends in parallel to the equator S of the tire, and in particular, in the case where the second cord 8a is formed in a spiral manner, the second belt 8 is less prone to stretch in the circumferential direction of the tire. If the difference in the peripheral length of the belt increases, the large shearing deformation occurs at the tread rubber disposed between the second belt 8 and the road surface at the time when the tire rotates. This causes the energy loss in the tread rubber resulting from the strain, possibly increasing the rolling resistance. However, if the above-described range is satisfied, the difference in the peripheral length of the belt is sufficiently small, which makes it possible to reduce the rolling resistance. If the δ/Rs is undesirably small and the second belt 8 has a significantly flat shape, a force of the side wall portion 2 pushing the tread portion 3 causes the road-contacting pressure to be excessively high at the outer side end of the road-contacting surface of the tire in the width direction, possibly deteriorating the uneven wear resistance. However, if the above-described range is satisfied, it is possible to effectively suppress the occurrence of the uneven wear.

In the tread portion 3, the curvature radius Rt at a center area 3a located at the center of the tread portion 3 in the width direction is preferably set to more than or equal to 700 mm where Rt represents a curvature radius of the outer surface of the tread portion 3 in the cross section including the axis of the tire in a state where the tire is assembled with an applicable rim and has an inner pressure inflated. Note that the upper limit of the curvature is infinite. This means that the outer shape of the center area 3a is straight in the cross section including the axis of the tire.

The tread portion 3 includes the center area 3a located at the center of the tire in the width direction and shoulder areas 3b located at both side ends of the central portion 3a in the cross section including the axis of the tire illustrated in FIG. 4. With the width of the second belt 8 being set to 100%, the center area 3a occupies 10% to 95% of the tread portion 3 so as to extend uniformly in the left-right direction with the equator S of the tire being as the center, and the shoulder areas 3b each occupy 45% to 2.5% of the tread portion 3, which is the remainder of the tread portion 3. Note that the width of the second belt 8 means a length between the centers of the second cords 8a located at both outside ends of the second belt 8 in the width direction, and indicates a length between the centers of the cords located at the outermost positions other than the overlapping portion 8b in the case where the overlapping portion 8b is provided. Further, it is preferable that the center area 3a occupies approximately 60% in order to satisfy various performances of the tire.

The center area 3a of the tread portion 3 is hardly affected by the force of the side wall portion 2 pushing the tread portion 3. Thus, by setting the curvature radius Rt at the center area 3a to 700 mm or more to make this area almost flat surface, it is possible to advantageously reduce the rolling resistance of the tire. Note that the rolling resistance of the tire can be further advantageously reduced by setting the curvature radius Rt to 1500 mm or more.

FIG. 6 through FIG. 9 are diagrams each illustrating a pneumatic tire according a third embodiment of the present invention.

Figure 6:
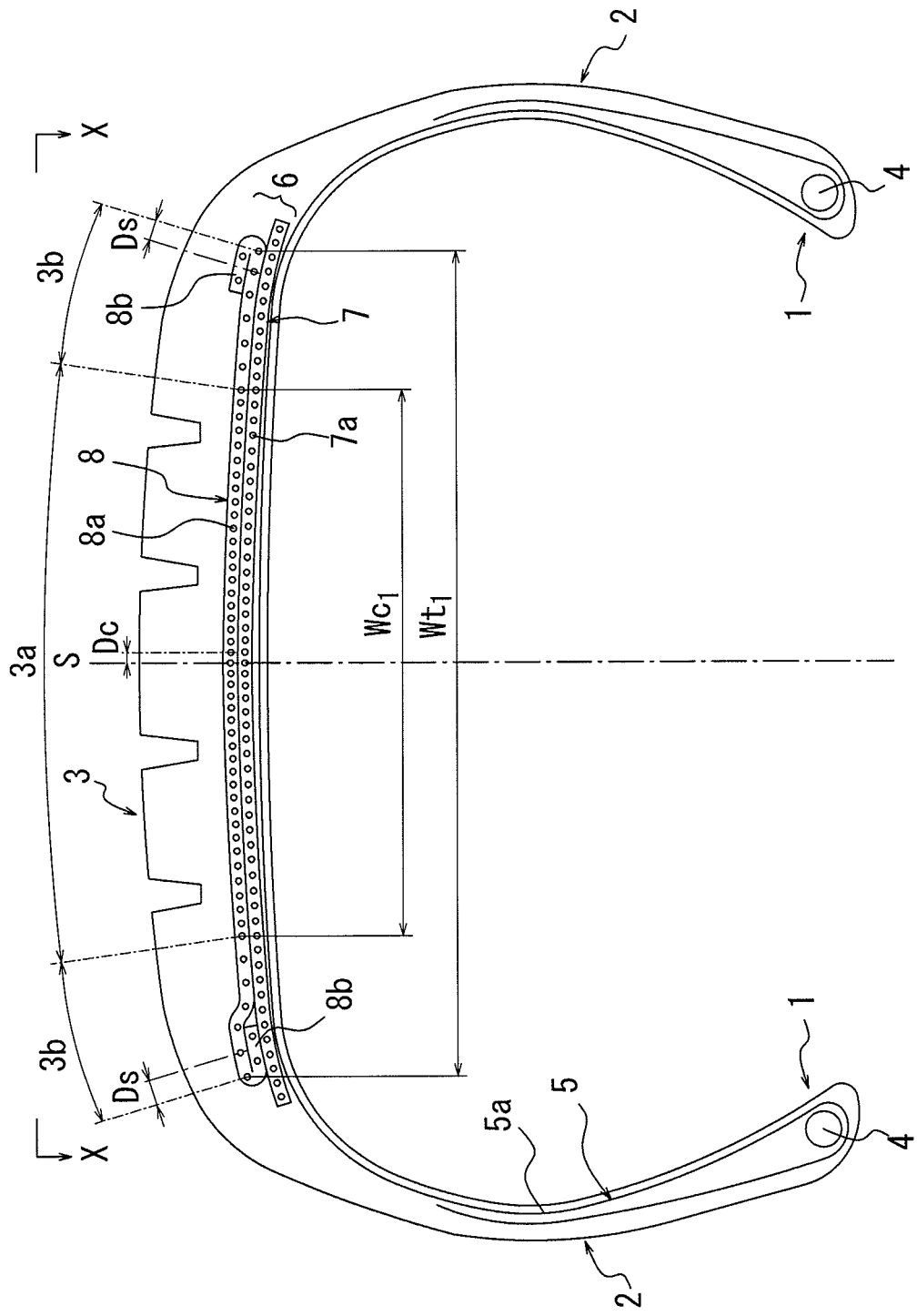
FIG. 6 is a diagram illustrating a pneumatic tire according to a third embodiment of the present invention, and is a sectional view illustrating a half part of the tire taken along the meridian section of the tire including the axis of the tire.

In FIG. 6, the reference numeral 1 represents the bead portion, the reference numeral 2 represents the side wall portion, the reference numeral 3 represents the tread portion, the reference numeral 4 represents the bead core, the reference numeral 5 represents the carcass layer, and the reference numeral 6 represents the belt layer. These constituent components are common to those described in the first embodiment, and hence, description thereof will not be repeated. Note that, in the example illustrated in FIG. 6, the carcass layer 5 is illustrated as one carcass ply 5a. However, it may be possible to employ plural carcass plies 5a.

Figure 7:
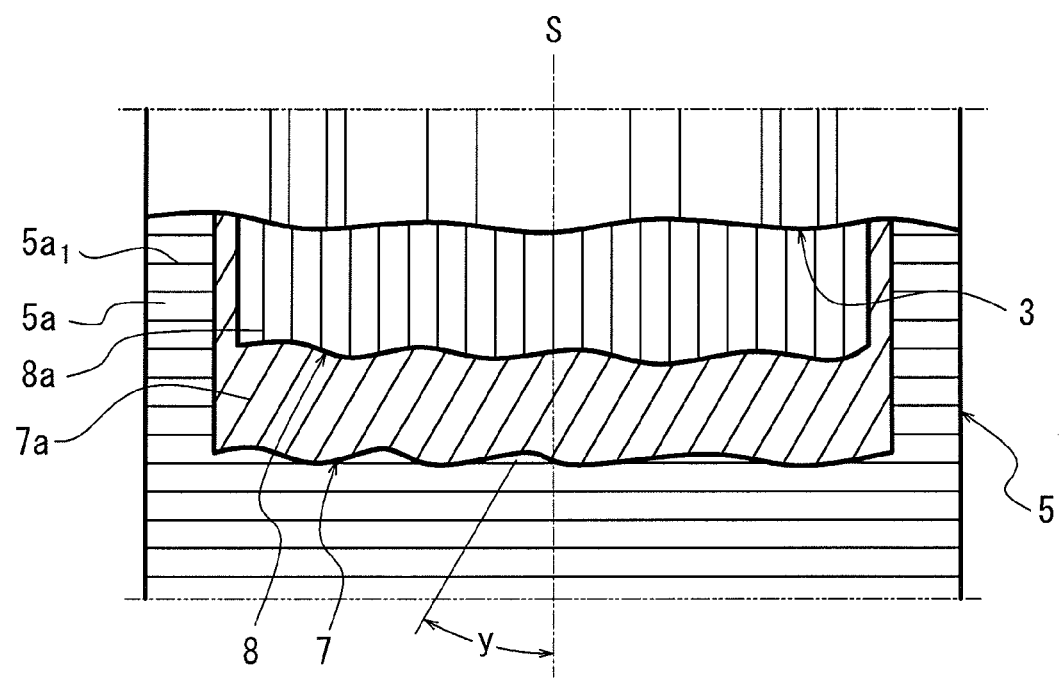
FIG. 7 is a fragmentary view taken in the direction of the arrow X-X in FIG. 6, and a diagram illustrating a structure of the interior of the tire in which a part of the tire is fragmentized (the overlapping portion 8b is not illustrated).

As illustrated in FIG. 7, the first belt 7 has one or more layers (FIG. 7 illustrates a case of one layer) of the first cord 7a inclined at an angle y with respect to the equator S of the tire. The angle y of the first cord 7a is set in the range of 15° to 75°. This is because, in the case where the angle with respect to the equator S of the tire is less than 15°, the first cord 7a is almost in parallel to the second cord 8a, which will be described later. This makes it difficult to achieve a pantograph effect necessary to secure flexibility in the tire radial direction. Further, with this configuration, there is a possibility that sufficient interlayer shearing rigidity cannot be obtained. On the other hand, in the case where the angle with respect to the equator S of the tire exceeds 75°, the cord 7a is almost in parallel to cords of the carcass ply 5a, and hence, there is a possibility that the pantograph effect reduces and the interlayer shearing rigidity becomes insufficient.

A material for the first cord 7a may be selected from various materials, for example, of an organic fiber such as aramid, polyethylene and nylon, a glass fiber, and a steel.

The second belt 8 has one or more layers (FIG. 7 illustrates a case of one layer) of the second cord 8a extending in parallel to the equator S of the tire. The expression "extending in parallel to the equator S of the tire" as used in this specification specifically means extending at an angle range of 0° to 5° with respect to the equator S of the tire. This is because, in the case where a cord-rubber covering layer having a wide shape is wrapped one time, the angle is set to 0°, and in the case where the cord-rubber covering layer formed by a narrow ribbon is wrapped in a spiral manner, the angle is set to 5° or less by considering the cord angle. Further, the error related to the manufacturing is also taken into consideration.

A material for the second cord 8a may be selected from various materials, for example, of an organic fiber such as aramid, polyethylene and nylon, a glass fiber, and a steel. The second belt 8 may have a configuration in which plural second cords 8a are arranged in parallel to the equator S of the tire as described above, or may have a configuration of a spiral cord in which the second cord 8a is wrapped spirally.

It may be possible to provide the overlapping portion 8b at both side ends in the width direction as illustrated in FIG. 6 in the case where the second belt 8 is formed by turning up the narrow width rubber having the second cord 8a spirally in a direction along the circumferential direction of the tire. This prevents the occurrence of the separation starting from a wrapping starting end or a wrapping terminating end of the second cord 8a.

The tread portion 3 includes the center area 3a located at the center of the tire in the width direction and shoulder areas 3b located at both side ends of the central portion 3a in the cross section including the axis of the tire illustrated in FIG. 6. With the width of the second belt 8 being set to 100%, the center area 3a occupies 10% to 95% of the tread portion 3 so as to be uniform in the left-right direction with the equator S of the tire being as the center, and the shoulder areas 3b each occupy 45% to 2.5% of the tread portion 3, which is the remainder of the tread portion 3. Further, it is preferable that the center area 3a occupies approximately 60% in order to satisfy various performances of the tire. Note that the reference character $Wt_1$ represents the width of the second belt 8, which is a length between the centers of the second cords 8a located at both outside ends of the second belt 8 in the width direction. In the case where the overlapping portion 8b is provided, $Wt_1$ indicates a length between the centers of the cords located at the outermost positions other than the overlapping portion 8b. The reference character $Wc_1$ represents a length between the centers of the second cords 8a located at both outside ends of the center area 3a in the width direction.

In the second belt 8 according to the present invention, an interval Ds between the second cords 8a located in the shoulder areas 3b is larger than an interval Dc between the second cords 8a located in the center area 3a. The term "interval Ds" represents an interval obtained by selecting a predetermined number of the second cords 8a from the cords 8a located at the outermost positions other than the overlapping portion 8b, and averaging the intervals between the selected cords. The term "interval Dc" represents an interval obtained by selecting the same number as the above-described predetermined number of the second cords 8a so as to be symmetry with respect to the equator S of the tire, and averaging the intervals between the cords.

Figure 8:
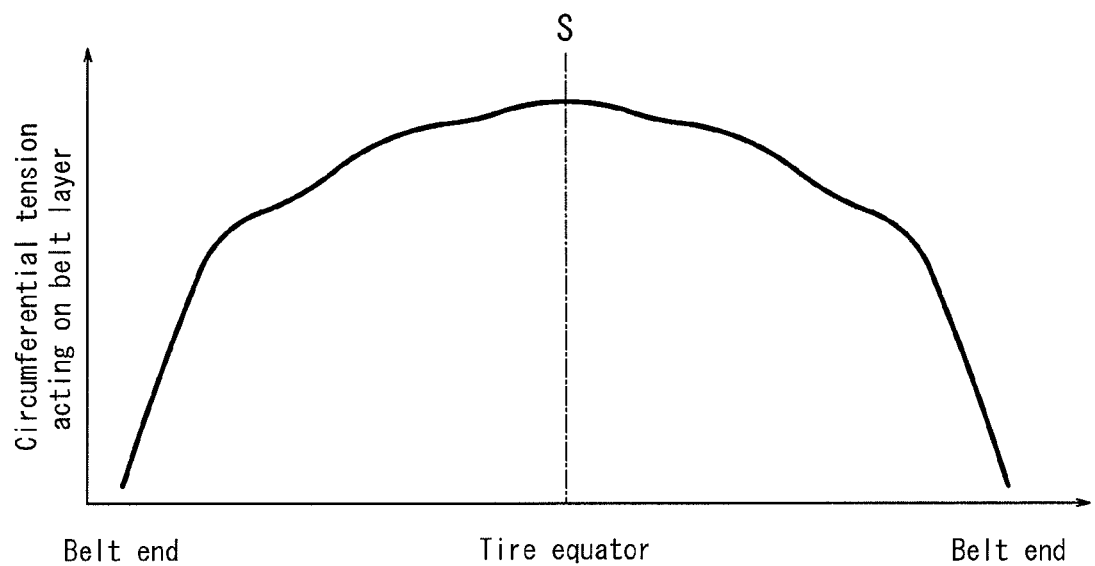
FIG. 8 is a diagram illustrating how tension acting on a belt layer in the tire circumferential direction is distributed in the width direction.

In the case of the general tires, the tension acting on the belt layer in the circumferential direction at the time when the inner pressure is inflated is higher at the equator of the tire and is lower at the belt ends as illustrated in FIG. 8. If the number of cords of the belt reduces in order to reduce the weight of the tire, there arises a concern that the tire breaks because the tire cannot withstand the tension in the circumferential direction. However, in the shoulder area 3b where the tension acting on the belt layer in the circumferential direction is lower, even if the interval Ds of the second cords 8a is widened to reduce the density of the cords, it is possible to sufficiently secure the safety factor against the breakage, and to reduce the weight without deteriorating the breaking strength of the tire.

It is preferable that the second cord 8a satisfies a relationship 1.2<Ds/Dc<3.0, where Dc is an interval of cords located in the center area 3a, and Ds is an interval of cords located in the shoulder area 3b. In the case where Ds/Dc is equal to or less than 1.2, the effect of reducing the weight of the tire is undesirably small, and in the case where Ds/Dc is more than or equal to 3, the density of the cords in the shoulder area 3b is excessively low, and there is a concern that breakage of the tire occurs from the shoulder area 3b. However, by setting Ds/Dc within the above-described range, it is possible to further advantageously reduce the weight of the tire while maintaining the breaking strength of the tire.

Figure 9:
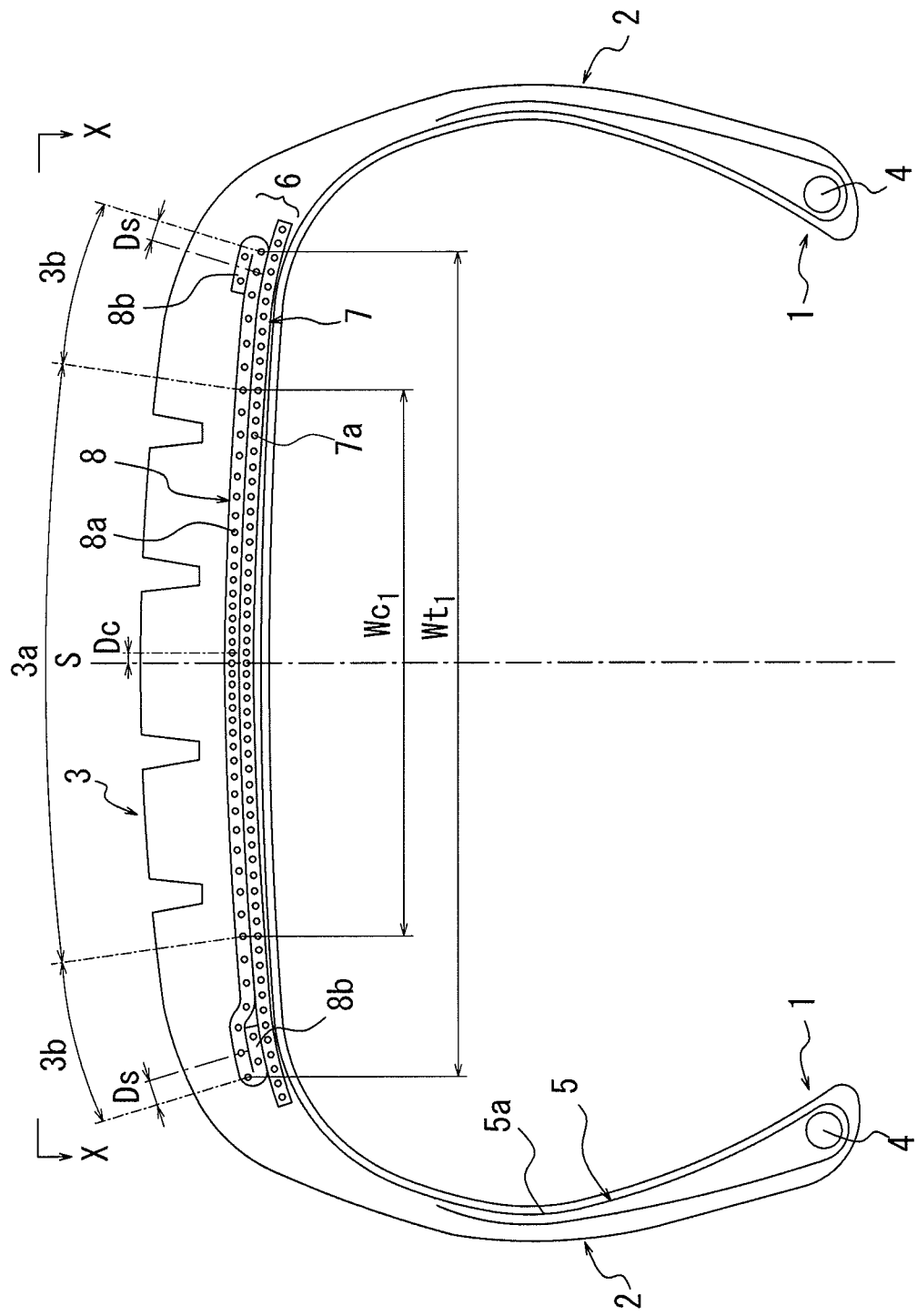
FIG. 9 is a diagram illustrating another embodiment of the pneumatic tire illustrated in FIG. 6, and is a sectional view illustrating a half of the tire taken along the meridian section of the tire including the axis of the tire.

It is preferable that the second cord 8a has a cord arrangement in which the interval of the cords gradually increases from the equator S of the tire toward the outer side in the width direction of the tire. The tension acting on the belt layer in the circumferential direction at the time of inflation with the inner pressure is the largest at the equator S of the tire and tends to decrease toward the outer sides in the width direction as illustrated in FIG. 8. By gradually increasing the interval of the second cords 8a from the equator of the tire toward the outer sides in the tire width direction in accordance with the change in the tension in the circumferential direction, it is possible to arrange the cords in the most appropriate distribution, and to reduce the weight of the tire while maintaining the necessary safety factor against the breaking strength of the tire. Further, considering the easiness of the manufacturing, it is possible to sufficiently reduce the weight of the tire, by gradually increasing the interval of the second cords 8a at a certain rate from the equator S of the tire toward the outer sides in the width direction as illustrated in FIG. 9.

Figure 10:
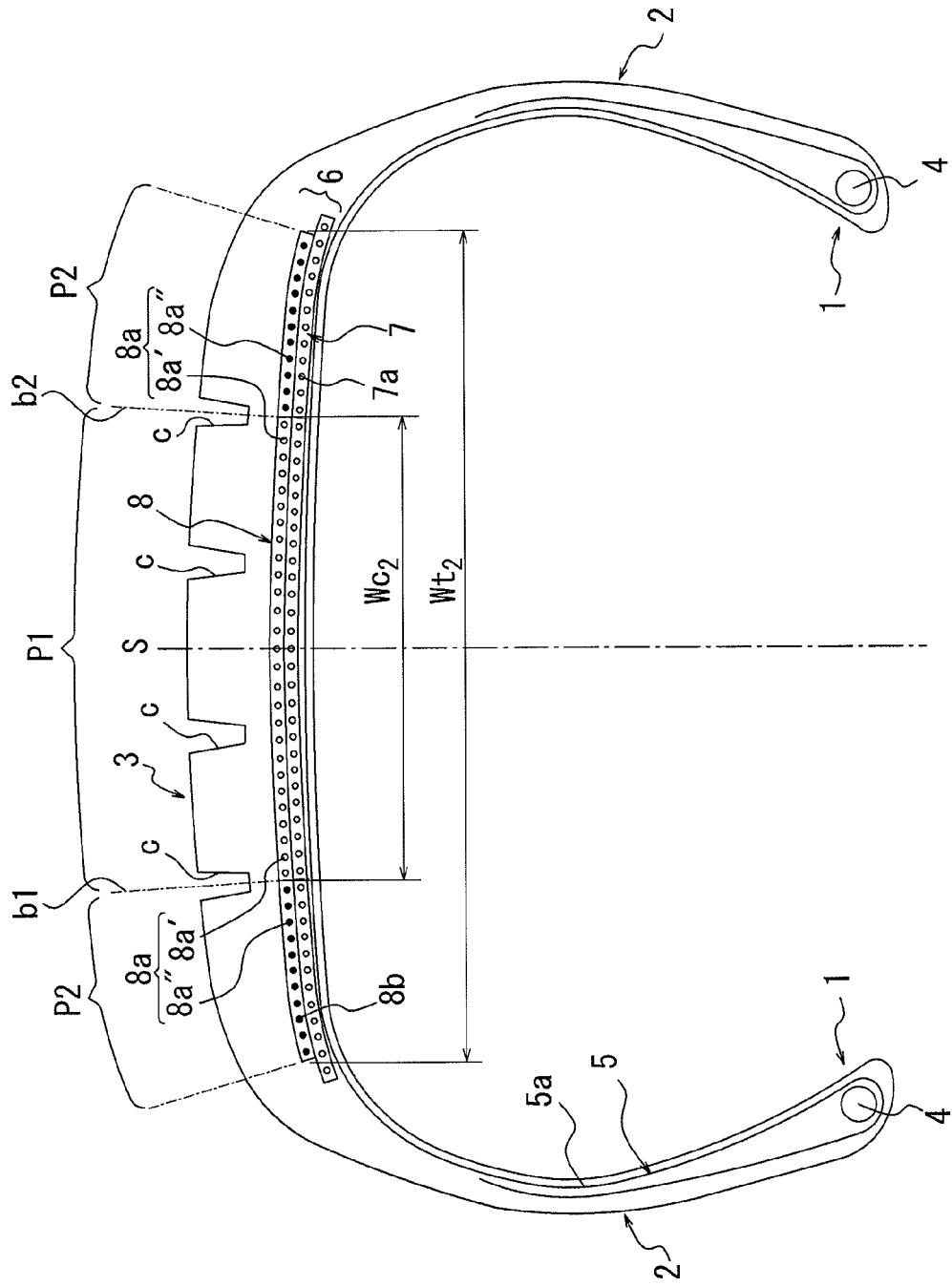
FIG. 10 is a diagram illustrating a pneumatic tire according to a fourth embodiment of the present invention, and is a sectional view illustrating a half of the tire taken along the tire width direction.
Figure 11:
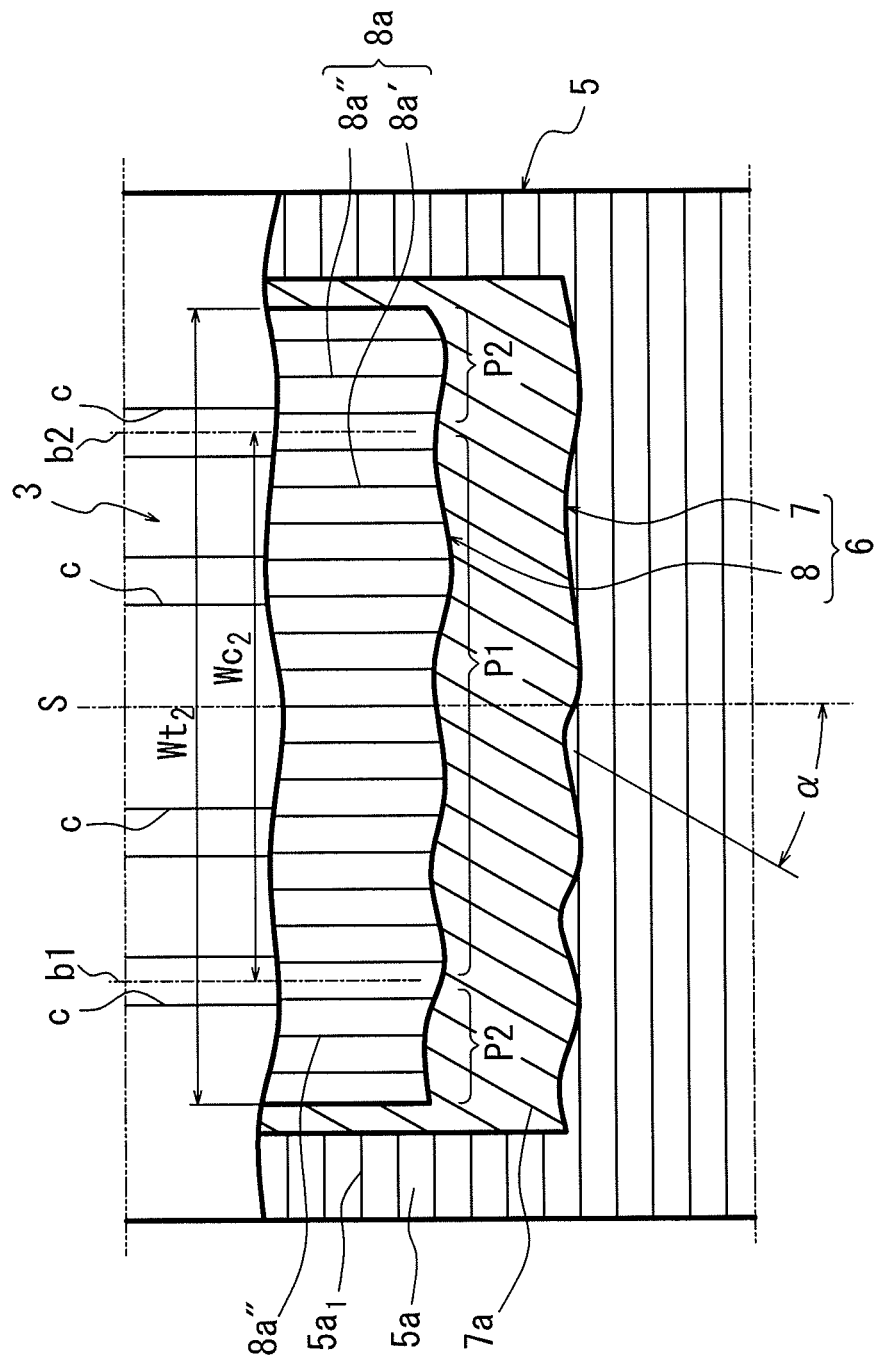
FIG. 11 is a schematic view for explaining a positional relationship of cords of a carcass ply and cords of a belt of the pneumatic tire in FIG. 10.

FIG. 10 through FIG. 12 are diagrams each illustrating the pneumatic tire according to a fourth embodiment of the present invention.

In FIG. 10, the reference numeral 1 represents the bead portion, the reference numeral 2 represents the side wall portion, the reference numeral 3 represents the tread portion, the reference numeral 4 represents the bead core, the reference numeral 5 represents the carcass layer, and the reference numeral 6 represents the belt layer. These constituent components are common to those described in the first embodiment, and hence, description thereof will not be repeated. Note that, in the example illustrated in FIG. 10, the carcass layer 5 is illustrated as one carcass ply 5a. However, it may be possible to employ plural carcass plies 5a.

As illustrated in FIG. 11, the belt layer 6 has one or more layers (one layer in this embodiment) of inclined belt layer (first belt) 7, which is formed by rubberizing plural inclined cords (first cords) 7a extending obliquely at an angle α in the range of 15° to 75° measured from the acute angle side with respect to the equator S of the tire, and one or more layers (one layer in this embodiment) of circumferential belt layer (second belt) 8 provided adjacently at the outer side of the inclined belt layer 7 in the tire radial direction and extending at an angle in the range of 0° to 5° with respect to the equator S of the tire, this circumferential belt layer 8 formed by rubberizing plural circumferential cords (second cords) 8a. Note that the circumferential belt layer 8 may be disposed adjacently at the inner side of the inclined belt layer 7 in the tire radial direction. Further, the circumferential belt layer 8 may have, at its ends, a turned-up portion (overlapping portion) 8b as illustrated in FIG. 12. The turned-up portion is formed at the starting time of the wrapping and the ending time of the wrapping as the circumferential cords 8a is wrapped spirally in the tire circumferential direction. This turned-up portion 8b may not be formed.

With the belt structure as described above, in addition to a hooping effect obtained by the circumferential belt layer 8, the intersecting layer formed by the circumferential belt layer 8 and the inclined belt layer 7 achieves the favorable tension, compression, shearing rigidity, whereby it is possible to simplify the inclined belt layer 7 having a relatively small effect on the breaking strength of the tire, in other words, to reduce the number of the inclined cords 7a constituting the inclined belt layer 7. This makes it possible to reduce the weight of the tire as compared with belts formed by steel cords for which the angle of the cords constituting the belt is not optimized. Note that, in the case where the angle α of the inclined cord 7a with respect to the equator S of the tire is less than 15°, the inclined cord 7a is almost in parallel to the circumferential cord 8a of the circumferential belt layer 8, and hence, there is a possibility that the sufficient interlayer shearing rigidity cannot be obtained. In the case where the angle α exceeds 75°, the so-called pantograph effect between the inclined cord 7a and the cord 5a1 constituting the carcass ply 5a reduces, possibly reducing the interlayer shearing rigidity. Further, the reason for setting the circumferential cord 8a of the circumferential belt 8 at an angle in the range of 0° to 5° is that, in the case where a cord-rubber covering layer having a wide shape is wrapped one time, the angle is set to 0°, and in the case where the cord-rubber covering layer formed by a narrow ribbon is wrapped in a spiral manner, the angle is set to 5° or less by considering the cord angle.

Further, the circumferential belt layer 8 includes a central portion P1 including the equator position of the tire when viewed in the tire width direction, and a pair of side portions P2 located at both sides of the central portion P1. In the circumferential belt layer 8, the tensile rigidity at the central portion P1 is larger than that at the side portions P2. The tensile rigidities at the central portion P1 and the side portions P2 of the circumferential belt layer 8 can be expressed by multiplying the tensile rigidity (unit: N) per each circumferential cord 8*a* by the number of the circumferential cords 8*a* per unit width (10 mm in this embodiment) of the circumferential belt layer 8, and multiplying the thus obtained value by the size of the central portion P1 or side portion P2 in the tire width direction. Note that, at the time of calculation of the tensile rigidity of the circumferential belt layer 8, the turned-up portions 8*b* formed at the end portions of the circumferential belt layer 8 in the width direction are not taken into account.

In this embodiment, in the central portion P1 and the side portions P2 of the circumferential belt layer 8, the number of the circumferential cords 8*a* (hereinafter, the circumferential cord at the central portion P1 is denoted by the reference character 8*a'* and the circumferential cord at the side portion P2 is denoted by the reference character 8*a"*) per unit width are set to be equal. However, by using different materials between the circumferential cord 8*a'* at the central portion P1 and the circumferential cord 8*a"* at the side portions P2, the tensile rigidity at the central portion P1 of the circumferential belt layer 8 is made larger than that at the side portions P2 of the circumferential belt layer 8. More specifically, the circumferential cord 8*a'* at the central portion P1 is formed by the steel cords (indicated in white color in FIG. 10 and FIG. 12), and the circumferential cord 8*a"* at the side portions P2 are formed by the organic fiber cords (indicated in black in FIG. 10 and FIG. 12). It may be possible to use various materials for the organic fiber cord, which includes aramid, polyethylene terephthalate, and polyethylene naphthalate.

It should be noted that there is not any specific limitation on the material of the inclined cord 7*a* constituting the inclined belt layer 7. It may be possible to select from various materials, for example, of an organic fiber such as aramid, polyethylene terephthalate and nylon, glass fiber, and steel.

Next, the operations of the pneumatic tire according to the present invention will be described. An end portion of the circumferential belt layer 8 located at the outer side in the turning direction during the cornering is a portion repeatedly receiving the largest compression force in the circumferential belt layer 8. In particular, the extremely large compression force acts at the time of traveling with lower inner pressure in such a case where the inner pressure of the tire is not appropriately managed. Thus, the end portion of the circumferential belt layer 8 is the portion that is most likely to break in the circumferential belt layer 8 due to fatigue. Further, during the cornering, the largest side force occurs in the vicinity of the equator S of the tire where relatively high tension acts on the belt layer 6. In order to generate the larger cornering force, it is effective to increase the belt rigidity in the vicinity of the equator S of the tire. In this respect, the pneumatic tire according to the present invention has a configuration in which the rigidity at the central portion P1 of the circumferential belt layer 8 is higher than that at the side portions P2, and the side portions P2 are formed by the organic fiber cords. This makes it possible to secure the favorable cornering force at the central portion P1 and reduce the fatigue at the side portions P2, whereby it is possible to improve the handling stability and durability while reducing the weight of the tire by improving the belt structure.

Further, according to the pneumatic tire of this embodiment, the circumferential cord 8*a'* constituting the central portion P1 of the circumferential belt layer 8 is formed by the steel cord. The steel cord has extremely high strength and elastic modulus as compared with the organic fiber cord. Further, although the organic fiber cord has the strength and rigidity only in the tensile direction, the steel cord has the strength and rigidity in the bending, shearing, and compression direction, in addition to the tensile direction. Thus, it is possible to reliably enhance the hooping effect and increase the cornering force by disposing the steel cord at the central portion P1. The circumferential cord 8*a"* constituting the side portion P2 of the circumferential belt layer 8 is formed by the organic fiber cord. Thus, it is possible to reliably enhance the fatigue resistance against the compression and tension repeatedly inputted to the side portions P2. Further, with the configuration as described above, in the case where the thread intervals (thread counts) of the cords 8*a'* and 8*a"* are equal throughout the entire circumferential belt layer 8, in other words, are equal in the central portion P1 and the side portions P2, it is possible to make the tensile rigidity at the central portion P1 larger than that at the side portions P2.

It should be noted that, generally, in the pneumatic tire, the compression force acting on the belt at the time of cornering largely decreases from the belt ends toward the inner side in the tire width direction. Thus, it is only necessary to set the central portion P1 having the higher rigidity to at least 10% of the length of the circumferential belt in the tire width direction. In particular, it is preferable to reduce the size of the side portions P2 in the tire width direction, while setting the central portion P1 having the higher rigidity to 50% or more in order to sufficiently secure the size of the central portion P1. In other words, it is preferable to satisfy $Wc_2/Wt_2 \geq 0.5$, where $Wc_2$ is a size of the central portion P1 of the circumferential belt layer 8 in the tire width direction, and $Wt_2$ is a size of the entire circumferential belt layer 8 in the tire width direction. However, if the size of the side portions P2 in the tire width direction is excessively small, the central portion P1 has to bear the compression input during the cornering, possibly causing the fatigue at the central portion P1. Thus, it is preferable to satisfy $Wc_2/Wt_2 \leq 0.95$. As a result, the preferable mode employs $0.5 \leq Wc_2/Wt_2 \leq 0.95$.

Further, in the circumferential belt layer 8, it is preferable that boundaries b1 and b2 between the central portion P1 and the side portions P2 are located immediately below a circumferential groove c formed on the tread portion 3. With this configuration, it is possible to reduce the effect of the difference in rigidity between the central portion P1 and the side portions P2 on the traveling performance.

The descriptions have been made with reference to the illustrated examples. However, the present invention is not limited to the embodiments described above, and it may be possible to make changes depending on application within the scope of claims. For example, in the case where the traveling performance is more important than the weight reduction, it may be possible to further dispose a reinforcing layer (not illustrated) formed, for example, by the organic fiber cord, on the outer side in the tire radial direction of the belt layer 6 having the circumferential belt layer 8 and the inclined belt layer 7. Further, to make the tensile rigidity at the central portion P1 of the circumferential belt layer 8 larger than that at the side portions P2, it may be possible to change the number of the circumferential cord 8*a* in place of or in addition to using different materials between the central portion P1 and the side portions P2. For example, it may be possible to use two layers of belt plies constituting the circumferential belt layer 8 in the central portion P1 and use one layer of belt ply in the side portions P2, while using the organic fiber cords for the circumferential cords 8*a'* and 8*a"*. Alternatively, it may be possible to arrange the circumferential cords 8*a'* densely in the central portion P1 and arrange the circumferential cords 8*a"* loosely in the side portions P2. Alternatively, it may be possible to change the diameter of the circumferential cords or change the types of the organic fiber cords.

EXAMPLE

Example 1

Tires each having a structure illustrated in FIG. 1 with a size of 225/45R17 and including the first belt and the second belt as shown in Table 1 were manufactured, in which the carcass layer had two carcass plies each formed by stranded polyethylene cords; the first belt employed the steel cords with an angle y of 30° with respect to the equator of the tire; and the second belt employed the spiral cords made of steel and extending almost parallel to the equator of the tire. The tires described above were examined on the mass thereof, breaking strength, cornering power, and dry performance. The results thereof are shown in Table 1.

TABLE 1

| | First belt | | | Second belt | | | | | | | |
|---|---|---|---|---|---|---|---|---|---|---|---|
| | Cord strength [N] | Number of cords [thread/mm] | Tensile strength [N/mm] | Cord strength [N] | Number of cords [thread/mm] | Tensile strength [N/mm] | Ratio of tensile strength | Mass of tire (index) | Breaking strength (index) | Cornering power (index) | Dry performance |
| Reference tire A | 600 | 0.72 | 432 | 600 | 0.72 | 432 | 1 | 100 | 100 | 100 | 6.5 |
| Comparative tire 1A | 300 | 0.72 | 216 | 300 | 0.72 | 216 | 1 | 92 | 50 | 94 | 6.0 |
| Comparative tire 2A | 900 | 0.72 | 648 | 900 | 0.72 | 648 | 1 | 105 | 150 | 105 | 6.5 |
| Applicable tire 1A | 200 | 0.54 | 108 | 600 | 0.72 | 432 | 4 | 93 | 100 | 91 | 6.0 |
| Applicable tire 2A | 200 | 0.72 | 144 | 600 | 0.72 | 432 | 3 | 93 | 100 | 94 | 6.0 |
| Applicable tire 3A | 300 | 0.72 | 216 | 600 | 0.72 | 432 | 2 | 95 | 100 | 98 | 6.5 |
| Applicable tire 4A | 600 | 0.48 | 288 | 600 | 0.72 | 432 | 1.5 | 97 | 100 | 100 | 7.0 |
| Applicable tire 5A | 200 | 0.48 | 96 | 600 | 0.72 | 432 | 4.5 | 92 | 100 | 84 | 5.0 |
| Applicable tire 6A | 600 | 0.6 | 360 | 600 | 0.72 | 432 | 1.2 | 98 | 100 | 100 | 6.5 |

It should be noted that the cord strengths of the first belt and the second belt in Table 1 were measured in accordance with JIS L 1017 with a tensile tester in a test room under a standard state set forth in JIS L 0105.

For the number of the cords of the first belt and the second belt, the number of the cords per 50 mm was measured by cutting the tire perpendicularly to the direction in which cords disposed in the belts extended. Then, the number of the cords was divided by 50 to convert the thus obtained value into the number of the cords per 1 mm.

The tensile strengths of the first belt and the second belt were converted into the tensile strengths by multiplying the cord strengths by the thread counts (Equation 1 and Equation 2). A ratio of the tensile strength indicates a ratio of the tensile strength of the second belt with respect to the tensile strength of the first belt.

The mass of the tire is indicated in Table 1 by indices with a conventionally used tire being a reference tire A and the mass of the reference tire A being 100. The smaller index value represents the lighter mass.

The breaking strength of the tire was measured such that: each of the tires was assembled with a rim having a size of 7.5 J×17 specified in JATMA (The Japan Automobile Tyre Manufacturers Association, Inc.); water was injected into the tire and pressure was applied to the tire; the pressure was increased until the tire broke; and, the breaking pressure of each of the tires was compared. The reference tire A satisfied the breaking strength, and the breaking strength of each of the tires is indicated in Table 1 by indices with the breaking strength of the reference tire A being 100. The larger index value represents the higher safety factor.

The cornering rigidity was measured such that: each of the tires was assembled with the above-described rim and inflated at an inner pressure of 230 kPa; a speed was set to 80 km/h with a flat belt tester; the difference in side force between slip angles of 1° and 0° was measured as the cornering power; and, the cornering powers were compared. The cornering power of each of the tires is indicated in Table 1 by indices with the reference tire being 100. The larger index value represents the higher cornering power, and exhibits the excellent rigidity in cornering. The number is desired to be 90 or more.

The dry performance was measured such that: each of the tires was assembled with the above-described rim and inflated to an inner pressure; the inflated tire was mounted to a vehicle made in Japan with a front-engine, rear-wheel drive layout having a displacement of 2500 cc; a skilled test driver traveled the vehicle on a test course with lane changes at a speed of 150 km/h, limit traveling at a speed of 80 km/h and acceleration from a speed of 50 km/h; and, test results were evaluated based on a scale of 10. The larger value represents the higher dry performance, and the number is desired to be 6 or more.

As a result of the measurements described above, the tire (comparative tire 1A) including the first belt and the second belt each having a lower tensile strength as compared with the reference tire A exhibited lower breaking strength as compared with the reference tire A, and did not satisfy the performances. Further, the tire (comparative tire 2A) including the two belts having the larger tensile strength as compared with the reference tire A was heavier in mass as compared with the reference tire A, and did not satisfy the required weight reduction. On the other hand, the tires (applicable tires 1A to 6A) including the second belt having a tensile strength equal to that of the reference tire A and the first belt having a tensile strength lower than that of the second belt satisfied the breaking strength of the tire, and it was confirmed that the weight of the tire can be reduced.

It should be noted that, as shown in Table 1 and FIG. 3, there are tendencies that the cornering power and the dry performance are slightly lower in the tire (applicable tire 5A) having a ratio of tensile strength of 4.5, and the degree of mass reduction is slightly smaller in the tire (applicable tire 6A)

having a ratio of tensile strength of 1.2. However, it is confirmed that, by setting the tensile strength of the second belt to 1.5 to 4 times that of the first belt, the cornering power and the dry performance of the tire improve, and it is possible to achieve sufficient weight reduction and securing of the breaking strength of the tire, whereby the applicable tires 1A to 4A are favorable.

Example 2

Tires each having a structure illustrated in FIG. 4 with a size of 195/65R15 and including the first belt and the second belt as shown in Table 2 were manufactured, in which the carcass layer had one sheet of carcass ply formed by stranded polyethylene cords; the first belt employed the steel cords with an angle y of 30° with respect to the equator of the tire; the second belt employed the spiral cords made of steel and extending parallel to the equator of the tire; and the number of the cords of the first belt were 0.72 thread/mm and the number of the cords of the second belt were 0.72 thread/mm. The tires described above were examined on the rolling resistance and the uneven wear resistance. The results thereof are shown in Table 2.

inflated to the inner pressure of 210 kPa; and a drum tester provided with the drum having a diameter of 1.7 m and having a surface covered with a coating material for accelerating the wear was used. At this time, the speed was 80 km/h. Free-rolling was performed for 10 minutes, and then, input with an acceleration of 0.1 G was applied to the sample tire in the braking direction for 10 minutes, which were repeated until the end of 5000 km traveling. On the tread portion, the groove depth was measured at a portion (central portion) located at the equator of the tire and a portion (shoulder portion) located 15 mm inwards from the road-contacting end, and the amount of wear was calculated at each of the portions on the basis of the difference in the groove depth between before and after the traveling. The amount of wear at the shoulder portion was calculated by a ratio based on the amount of wear at the central portion, and the calculation results are shown in Table 2. As the ratio becomes nearer to 1, the tire wears more evenly, and exhibits more excellent uneven wear resistance. In the case where the ratio of the amount of wear exceeds 1, the shoulder portion wears earlier than the central portion, and in particular, the ratio of 2 or more represents the significant uneven wear.

As a result, the tire (reference tire B) having $\delta/Rs$ of 0.02 or more and Rt of less than 700 mm had a larger rolling resis-

TABLE 2

| | Rs [mm] | $\delta$ [mm] | $\delta$/Rs [mm] | Rt [mm] | Rolling resistance [index] | Uneven wear performance [ratio] |
|---|---|---|---|---|---|---|
| Reference tire B | 307 | 7 | 0.0228 | 600 | 100 | 1.50 |
| Applicable tire 1B | 307 | 6 | 0.01954 | 750 | 93 | 1.10 |
| Applicable tire 2B | 307 | 4 | 0.01303 | 1200 | 90 | 1.05 |
| Applicable tire 3B | 307 | 2 | 0.00651 | 1800 | 88 | 1.30 |
| Applicable tire 4B | 307 | 1 | 0.00326 | 2000 | 87 | 1.85 |
| Applicable tire 5B | 307 | 1 | 0.00326 | Infinite (straight line) | 86 | 1.90 |
| Comparative tire 1B | 307 | 0.7 | 0.00228 | Infinite (straight line) | 85 | 2.50 |

For the numbers of the cords of the first belt and the second belt, the number of the cords per 50 mm was measured by cutting the tire perpendicularly to the direction in which cords disposed in the belts extended. Then, the resulting number of the cords was divided by 50 to convert the thus obtained value into the number of the cords per 1 mm.

The dimensions of the tire (Rs: length in the radial direction, $\delta$: difference, Rt: curvature radius) were measured after each of the tires was assembled with a rim having a standard size specified in JATMA (6.0 J in this example), the inner pressure of 180 kPa was applied to the tire, and the tire was left for one or more days at a room temperature.

The rolling resistance test was performed such that: each of the tires was assembled with the above-described rim and inflated to an inner pressure of 210 kPa; a drum tester having a drum with a diameter of 1.7 m serving as the surface of the steel plate was used; and the rolling resistance of an axle shaft was examined. At this time, the speed was 80 km/h, and an applied load was 4.52 kN. In Table 2, the rolling resistance of each of the tires is indicated by indices with a reference tire B being 100. The smaller index value represents the more excellent performance. Considering errors and from the viewpoint of the market supremacy, the sample having the index value of 95 or lower is judged to have superiority. In particular, the sample having the index value of 90 or lower achieves the excellent effect.

The uneven wear resistance was examined such that: each of the tires was assembled with the above-described rim and tance. Further, the tire (comparative tire 1B) having $\delta/Rs$ of 0.003 or lower exhibits the larger uneven wear, and could not satisfy the performances. On the other hand, it was confirmed that the tire (applicable tires 1B to 5B) having $\delta/Rs$ of more than 0.003 and less than 0.02 and Rt of 700 mm or more satisfied the rolling resistance and the uneven wear resistance. In particular, with the tire (applicable tires 3B to 5B) having Rt of 1500 mm or more, it is possible to largely reduce the rolling resistance, and it is confirmed that this setting is further favorable in the case where the improvement of the rolling resistance is more important than that of the uneven wear resistance.

Example 3

Tires each having a structure illustrated in FIG. 6 with a size of 225/45R17 and including the second cord shown in Table 3 were manufactured, in which the carcass layer had two sheets of carcass plies each formed by stranded polyethylene cords; the first belt employed the steel cords with an angle y being 30° with respect to the equator of the tire; and the second belt employed the spiral cords made of steel extending parallel to the equator of the tire. For the tires described above, the mass and the breaking strength of the tires were examined. The results thereof are shown in Table 3.

TABLE 3

| | Dc [mm] | Ds [mm] | Ds/Dc | Increasing rate of cord interval | Mass [index] | Breaking strength [index] |
|---|---|---|---|---|---|---|
| Reference tire C | 1.2 | 1.2 | 1.0 | No change between central area and shoulder areas | 100.0 | 100 |
| Applicable tire 1C | 1.2 | 1.3 | 1.1 | Increase at constant rate from tire equator to belt end | 99.7 | 100 |
| Applicable tire 2C | 1.2 | 1.5 | 1.3 | Increase at constant rate from tire equator to belt end | 99.1 | 100 |
| Applicable tire 3C | 1.2 | 2 | 1.7 | Increase at constant rate from tire equator to belt end | 98.0 | 100 |
| Applicable tire 4C | 1.2 | 2.5 | 2.1 | Increase at constant rate from tire equator to belt end | 97.1 | 100 |
| Applicable tire 5C | 1.2 | 3 | 2.5 | Increase at constant rate from tire equator to belt end | 96.5 | 100 |
| Applicable tire 6C | 1.2 | 3.5 | 2.9 | Increase at constant rate from tire equator to belt end | 96.0 | 100 |
| Applicable tire 7C | 1.2 | 4 | 3.3 | Increase at constant rate from tire equator to belt end | 95.6 | 86 |
| Applicable tire 8C | 1.2 | 3 | 2.5 | Cord intervals are constant in each of center area and shoulder areas (Wc/Wt = 0.67) | 96.9 | 100 |
| Comparative tire 1C | 2.4 | 2.4 | 1.0 | No change in central area and shoulder areas | 95.9 | 53 |
| Comparative tire 2C | 3.5 | 3.5 | 1.0 | No change in central area and shoulder areas | 94.6 | 40 |

The intervals of the cords of the second belt were measured such that: each of the tires was cut perpendicularly to the direction in which cords in the tire extended; the distance between the centers of the cords of the four most nearest cords to the center of the tire in the width direction was measured in the center area; and the measured values were averaged to obtain the interval Dc of the cords. Further, in each of the shoulder areas, four cords were selected from the outermost cords except for the overlapping portions at both of the ends, the distances between the centers of the cords were measured, and the measured distances were averaged to obtain the interval Ds of the cords.

The mass of each of the tires was indicated in Table 3 by indices with a reference tire C being a tire having the conventionally used second belt whose cord intervals were equal in the center area and the shoulder areas, and with the mass of the reference tire C being 100. The smaller index value represents the lighter mass.

The breaking strength of the tire was measured such that: each of the tires was assembled with a rim with a size of 7.5 J×17 specified in JATMA (The Japan Automobile Tyre Manufacturers Association, Inc.); water was injected into the tire and pressure is applied to the tire; the pressure was increased until the tire broke; and, the breaking pressure of each of the tires was compared. The reference tire C satisfied the breaking strength, and the breaking strength of each of the tires was indicated in Table 3 by indices with the breaking strength of the reference tire C being 100. The larger value represents the higher safety factor.

As a result, it is found that the weight reduction could be achieved in the tires (comparative tires 1C and 2C) having the second belt whose second cords were arranged at equal intervals in both of the center area and the shoulder areas, as compared with the reference tire C. However, the comparative tires 1C and 2C could not satisfy the breaking strength. On the other hand, the tires (applicable tires 1C to 8C) in which the second cords of the second belt in the shoulder portions were arranged at cord intervals wider than those in the center area could satisfy the weight reduction and the breaking strength of the tire. Further, it was confirmed that, in the case where the Ds/Dc satisfied the relationship of 1.2<Ds/Dc<3.0 (applicable tires 2C to 6C and 8C), the weight reduction could be further advantageously achieved while the breaking strength is being maintained. Further, with the comparison between the tires having the constant Ds/Dc, in particular, the tire (applicable tire 5C) in which intervals of the second cords gradually increased at a certain rate was excellent in reducing the weight of the tire as compared with the tire (applicable tire 8C) in which intervals of the second cords were equal within each of the center area and the shoulder areas, and were wider in the shoulder areas than in the center area. Note that the ratio of the width of the second belt of the applicable tire 8C was $Wc_1/Wt_1$=0.67.

Example 4

Further, pneumatic tires of Examples 1D to 10D according to the present invention, and pneumatic tires of Conventional Examples 1D and 2D according to the conventional technique were prepared as samples, and performance evaluations (handling stability and durability) were made through the following tests. Descriptions thereof will be made below. Note that these pneumatic tires were radial tires with a size of 225/45R17.

The pneumatic tires of Examples 1D to 10D each had a belt structure illustrated in FIG. 10 and FIG. 11, and details of the belt structure of the pneumatic tires are shown in Table 4. Note that the pneumatic tires of Examples 1D to 10D each had a carcass formed by one sheet of carcass ply having a stranded structure in which polyethylene cords with 1670 dtex/2 were arranged in a direction at an angle of 90° with respect to the equatorial surface of the tire. Further, the inclined cords constituting the inclined belt layer were formed by a steel cord, and the inclined cords of each of the tires were inclined at an angle of 30° with respect to the equatorial surface of the tire. In Table 4, the reference character "$Wc_2$" represents a size of a central portion of the circumferential belt layer in the tire width direction, and the reference character "$Wt_2$" represents a size of the entire circumferential belt layer in the tire width direction.

The pneumatic tires of Conventional Examples 1D and 2D had configurations almost equal to the tires of the Examples 1D to 10D except for the circumferential belt layer. The configuration of the circumferential belt layer is shown in Table 4.

The handling stability test was conducted such that: each of the sample tires was assembled with an applicable rim having a size of 7.5 J×17 in this test and specified in YEAR BOOK of The Japan Automobile Tyre Manufacturers Association (JATMA), and was inflated to an inner pressure of 230 kPa; the inflated tire was mounted to the vehicle made in Japan with a front-engine, rear-wheel drive layout having a displacement of 2500 cc; a skilled test driver traveled the vehicle on a predetermined test course with lane changes at a speed of 150 km/h, limit cornering at a speed of 80 km/h and acceleration from a speed of 50 km/h; and, feeling evaluation was made based on a scale of 10. The results of the evaluation are shown in Table 4. The larger value represents more favorable handling stability. A score of 6.0 or more is acceptable.

The durability test was conducted such that: each of the sample tires was assembled with the above-described rim and inflated to an inner pressure of 80 kPa; the sample tires travels 50 km with a load of a side force of 0.8 G applied alternately to sides (right and left) of the tire with a drum tester having a surface of steel plate with a diameter of 1.7 m; after the traveling, the sample tires were decomposed; and the number of broken circumferential cords were counted. The evaluation results are shown in Table 4. Note that, in Table 4, the values of the durability are indicated by indices with the number of broken circumferential cords of the pneumatic tire of Conventional Example 1D being 100. The smaller index value represents the more excellent durability.

TABLE 4

| | Circumferential belt layer (cord angle 0° to 5°) | | | | | | | | | | | Performance evaluation | |
|---|---|---|---|---|---|---|---|---|---|---|---|---|---|
| | Central portion | | | | Side portion | | | | | | | | |
| | Tensile strength of cord [N] | Number of thread [thread/mm] | Tensile rigidity [N] | Material | Tensile strength of cord [N] | Number of thread [thread/mm] | Tensile rigidity [N] | Material | $Wc_2$ [mm] | $Wt_2$ [mm] | $Wc_2/Wt_2$ | Handling stability | Durability |
| Conventional Example 1D | 200 | 0.67 | 134 | Steel | 200 | 0.67 | 134 | Steel | — | — | — | 7.5 | 100 |
| Conventional Example 2D | 90 | 0.83 | 75 | Aramid | 90 | 0.83 | 75 | Aramid | — | — | — | 5.5 | 0 |
| Example 1D | 200 | 0.67 | 134 | Steel | 90 | 0.83 | 75 | Aramid | 80 | 180 | 0.44 | 6.0 | 0 |
| Example 2D | 200 | 0.67 | 134 | Steel | 90 | 0.83 | 75 | Aramid | 90 | 180 | 0.50 | 6.5 | 0 |
| Example 3D | 200 | 0.67 | 134 | Steel | 90 | 0.83 | 75 | Aramid | 110 | 180 | 0.51 | 7.0 | 0 |
| Example 4D | 200 | 0.67 | 134 | Steel | 90 | 0.83 | 75 | Aramid | 130 | 180 | 0.72 | 7.0 | 0 |
| Example 5D | 200 | 0.67 | 134 | Steel | 90 | 0.83 | 75 | Aramid | 150 | 180 | 0.83 | 7.5 | 0 |
| Example 6D | 200 | 0.67 | 134 | Steel | 90 | 0.83 | 75 | Aramid | 170 | 180 | 0.94 | 7.5 | 0 |
| Example 7D | 200 | 0.67 | 134 | Steel | 90 | 0.83 | 75 | Aramid | 175 | 180 | 0.97 | 7.5 | 40 |
| Example 8D | 200 | 0.67 | 134 | Steel | 30 | 1.0 | 30 | Polyethylen terephthalate | 150 | 180 | 0.83 | 7.0 | 0 |
| Example 9D | 200 | 0.67 | 134 | Steel | 30 | 1.0 | 30 | Polyethylene naphthalate | 150 | 180 | 0.83 | 7.0 | 0 |
| Example 10D | 180 | 0.67 | 121 | Aramid | 90 | 0.83 | 75 | Aramid | 150 | 180 | 0.83 | 7.0 | 0 |

As can be clearly understood from the test results, it is possible to achieve both the handling stability and the durability, by setting the tensile rigidity at the central portion of the circumferential belt layer larger than that at the side portions, and using the organic fiber cord for the circumferential cords at the side portions of the circumferential belt layer. In particular, it can be understood that, by setting the $Wc_2/Wt_2$ within the range of 0.5 to 0.95, it is possible to achieve both the handling stability and the durability at a high level.

INDUSTRIAL APPLICABILITY

As described above, according to the present invention, it is possible to provide a pneumatic tire having excellent durability, handling stability and uneven wear resistance while achieving the weight reduction by the improvement of the belt.

EXPLANATION OF REFERENCE CHARACTERS

1 Bead portion
2 Side wall portion
3 Tread portion
3a Center area
3b Shoulder area
4 Bead core
5 Carcass layer
5a Carcass ply
6 Belt layer
7 First belt (inclined belt layer)
7a First cord (inclined cord)
8 Second belt (circumferential belt layer)
8a Second cord (circumferential cord)
8b Overlapping portion (turned-up portion)
Rs Length in the radial direction to the center in the width direction
Re Length in the radial direction to the outermost end in the width direction
δ Difference between length Rs in the radial direction and length
Re in the radial direction
Rt Curvature radius
Dc Interval of second cord 8a in center area 3a
Ds Interval of second cord 8a in shoulder area 3b
P1 Central portion of circumferential belt layer
P2 Side portion of circumferential belt layer
S Equator of tire

The invention claimed is:

1. A pneumatic tire for a passenger vehicle having a carcass layer toroidally extending from a tread portion through a side wall portion to a bead portion, and a belt layer disposed at the outer side of the carcass layer in the tire radial direction, wherein
the carcass layer includes one or more carcass plies, and,
the belt layer consists of only two belts, which are comprised of a first belt and a second belt, the first belt having one layer of a first cord inclined with respect to a tire equator at an angle in the range of 15° to 75° and the second belt having one layer of a second cord extending in parallel to the tire equator,
said first belt having a tensile strength smaller than that of the second belt,
said first cord being a steel cord,
said second cord being an organic fiber cord.

2. The pneumatic tire according to claim 1, wherein the tensile strength of the second belt is 1.5 to 4 times the tensile strength of the first belt.

3. The pneumatic tire according to claim 1, wherein the second belt is disposed at the outer side of the first belt in the tire radial direction.

4. The pneumatic tire according to claim 1, wherein the first cord is inclined with respect to the tire equator at an angle in the range of 45° to 75°.

5. The pneumatic tire according to claim 1, wherein the second belt has a length in the tire width direction that is smaller than the first belt.

* * * * *